United States Patent
Paul et al.

(10) Patent No.: US 11,748,151 B1
(45) Date of Patent: Sep. 5, 2023

(54) SYSTEMS AND METHODS FOR EDITING, ASSIGNING, CONTROLLING, AND MONITORING BOTS THAT AUTOMATE TASKS, INCLUDING NATURAL LANGUAGE PROCESSING

(71) Applicant: FIRST AMERICAN FINANCIAL CORPORATION, Santa Ana (CA)

(72) Inventors: Angshuman Paul, Santa Ana, CA (US); Sana Ullah Khan, Santa Ana, CA (US); Jitendra Gupta, Santa Ana, CA (US)

(73) Assignee: FIRST AMERICAN FINANCIAL CORPORATION, Santa Ana, CA (US)

( * ) Notice: Subject to any disclaimer, the term of this patent is extended or adjusted under 35 U.S.C. 154(b) by 278 days.

(21) Appl. No.: 16/945,365

(22) Filed: Jul. 31, 2020

Related U.S. Application Data

(63) Continuation of application No. 15/829,839, filed on Dec. 1, 2017, now Pat. No. 10,768,977, which is a continuation of application No. 15/825,046, filed on Nov. 28, 2017, now abandoned.

(51) Int. Cl.
| | |
|---|---|
| *G06F 9/48* | (2006.01) |
| *G06F 9/445* | (2018.01) |
| *H04L 67/10* | (2022.01) |
| *G06F 11/34* | (2006.01) |
| *G06F 3/048* | (2013.01) |
| *G06F 40/00* | (2020.01) |
| *H04L 67/75* | (2022.01) |

(52) U.S. Cl.
CPC ............ *G06F 9/4843* (2013.01); *G06F 3/048* (2013.01); *G06F 9/44505* (2013.01); *G06F 11/3476* (2013.01); *G06F 40/00* (2020.01); *H04L 67/10* (2013.01); *H04L 67/75* (2022.05)

(58) Field of Classification Search
None
See application file for complete search history.

(56) References Cited

U.S. PATENT DOCUMENTS

| | | |
|---|---|---|
| 8,051,057 B2 | 11/2011 | Abu-Hakima et al. |
| 2010/0315972 A1 | 12/2010 | Plotnik et al. |
| 2016/0004628 A1* | 1/2016 | Gugri .................. G06F 11/3688 717/124 |
| 2016/0378859 A1 | 12/2016 | Banik et al. |
| 2018/0341573 A1 | 11/2018 | Patel et al. |
| 2019/0089697 A1 | 3/2019 | Delaney |

* cited by examiner

*Primary Examiner* — Eric C Wai
(74) *Attorney, Agent, or Firm* — Sheppard, Mullin, Richter & Hampton LLP

(57) ABSTRACT

A framework is described for editing, assigning, controlling, and monitoring multiple bots within an enterprise network, including bots that perform natural language processing. In one implementation, a method includes: initializing a bot controller application instance; receiving, at the bot controller application instance, registration information from bot hosts; retrieving, from a web services gateway, configuration information for each of the of bot hosts; and using at least the retrieved registration information and configuration information for each of the bot hosts, displaying at a graphical user interface of the bot controller application instance a summary of the registered bot hosts and data relating to scripts executed by each of the bot hosts.

20 Claims, 19 Drawing Sheets

FIG. 6C

SYSTEMS AND METHODS FOR EDITING, ASSIGNING, CONTROLLING, AND MONITORING BOTS THAT AUTOMATE TASKS, INCLUDING NATURAL LANGUAGE PROCESSING

CROSS-REFERENCE TO RELATED APPLICATIONS

This application is a continuation of and claims the benefit of U.S. patent application Ser. No. 15/829,839 filed on Dec. 1, 2017, and is issued as U.S. Pat. No. 10,768,977 on Sep. 8, 2020, which is a continuation of and claims the benefit of U.S. patent application Ser. No. 15/825,046, filed on Nov. 28, 2017 and abandoned Dec. 15, 2017. The contents of U.S. patent application Ser. No. 15/829,839 are incorporated herein by reference in their entirety.

TECHNICAL FIELD

The present disclosure relates generally to the use and control of bots, including bots that perform natural language processing.

BRIEF SUMMARY OF THE DISCLOSURE

Embodiments of the technology described herein are directed to a framework for editing, assigning, controlling, and monitoring multiple bots within an enterprise network, including bots that perform natural language processing.

In one embodiment, a method includes: initializing a bot controller application instance; receiving, at the bot controller application instance, registration information from each of multiple bot hosts; retrieving, from a web server, configuration information for each of the bot hosts; and using at least the retrieved registration information and configuration information for each of the bot hosts, displaying at a graphical user interface of the bot controller application instance a summary of the registered bot hosts and data relating to scripts executed by each of the bot hosts. In some implementations, each of the bot hots are hosted by unmanned, remote machines on an enterprise network.

In implementations, the registration information received from each bot host includes: a network address for each bot host (e.g., an IP address) and an identification of scripts currently installed on the bot host's associated machine. In some implementations, the bot controller application instance transmits a message to a web server upon initialization, and the web server broadcasts the message to each of the bot hosts. In response to receiving the notification, the bot hosts may initiate a registration process, including transmitting the registration information to the bot controller application instance.

In implementations, the displayed data relating to scripts executed by each of the bot hosts includes: an identification of a script currently being executed by each of the bot hosts and a timestamped notification of a most recent action performed by each of the bot hosts.

In implementations, the method further includes: determining at the bot controller application instance whether one of the bot hosts is under the control of another bot controller application instance. In particular implementations, if the bot host is under the control of another bot controller application instance, the method further includes: displaying at the graphical user interface a graphic indicating that the bot host is locked from use.

In implementations, the method further includes: receiving data corresponding to user input at the graphical user interface instructing one of the bot hosts to execute a script; transmitting the instruction to the bot host; and the bot host executing the script. In some implementations, the bot host executes the script by retrieving unstructured human instructions; and processing the unstructured instructions by calling a natural language processing module that performs the operations of: tokenizing the instructions into one or more sentences; identifying keywords or keyword synonyms in each of the one or more sentences using one or more dictionaries; and matching a keyword value associated with each of the identified keywords or keyword synonyms with a database value.

In implementations, the method further includes: receiving data corresponding to user input at the graphical user interface assigning a credential to one of the bot hosts, the credential granting the bot host access to a web-based application. During execution of a script, the bot host may access a web-based application using the assigned credential.

In implementations, the method further includes: displaying an indication at the graphical user interface that a first bot host is currently executing a first script; receiving data corresponding to user input at the graphical user interface instructing the first bot host to stop executing the first script; and after the first bot host stops execution of the first script; receiving data corresponding to user input at the graphical user interface assigning the first bot host a second script for execution.

In implementations, the method further includes: receiving notifications, in real-time, from the one of the bot hosts executing the script, the notifications corresponding to the execution of the script by the bot host; and displaying the received notifications at an activity log of the graphical user interface. The received notifications may be transmitted to a web services gateway for storage in a web server database.

In one embodiment, a method includes: registering multiple bot hosts on an enterprise network; initializing a bot controller application instance on multiple machines on the enterprise network; using the bot controllers: assigning one or more scripts for execution to each of the bot hosts registered on the enterprise network; and monitoring each of the bot hosts in real-time; and receiving and storing notifications generated by each of the bot hosts in response to executing the one or more assigned scripts. In implementations, the method further includes: storing configuration data for each of the bot hosts in real-time, wherein the configuration data is accessible by each of the bot controller application instances in real-time.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

FIG. 6C illustrates an example GUI of a bot controller that may be used to control and monitor bot hosts in accordance with embodiments.

Figure 1:
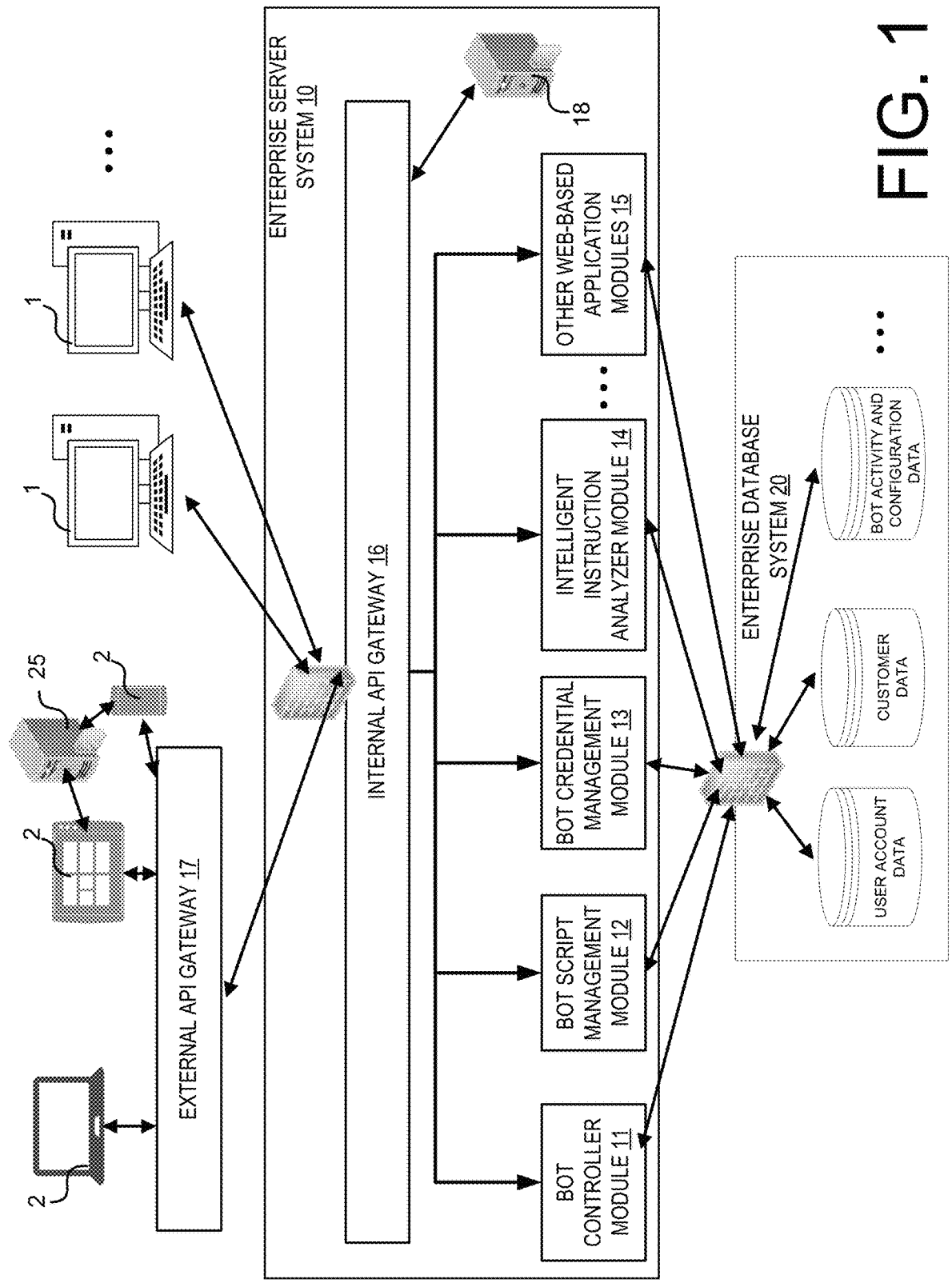
FIG. 1 illustrates an example enterprise system in which embodiments disclosed herein may be implemented.

The figures are not intended to be exhaustive or to limit various embodiments to the precise form disclosed. It should be understood that various embodiments can be practiced with modification and alteration.

DETAILED DESCRIPTION

As used herein, the term "bot" generally refers to a program (e.g., an executable script) that runs automated tasks on a networked device or virtual machine. A bot may be programmed to monitor different process specific queues.

As used herein, the term "bot host" generally refers to a program that is deployed on a networked device or virtual machine to instantiate and manage one or more bots. A bot host may be configured as a shell or container that executes bots. For example, a bot host may be deployed on an unmanned remote machine and assigned a predefined set of tasks that may be automatically completed by the bot host by instantiating one or more bot scripts. A bot host may interpret commands received from a bot controller and, in response to the commands, instantiate the appropriate bots and/or manage the execution of the bots (e.g., by delegating commands from a bot controller to different bots as required).

As used herein, the term "bot controller" generally refers to a software program or application that may be run on a networked device to control and monitor the operation of bot hosts. For example, a bot controller may be used to dynamically assign bot hosts to different enterprise tasks (e.g., by configuring the scripts run by the bot hosts), assign credentials to or remove credentials from bot hosts, and monitor the activities of bot hosts.

In today's enterprise environment, there are a number of enterprise tasks that are best suited for automation by one or more software applications. These enterprise tasks may entail a considerable amount of human effort and time to complete (and may be prone to human error), but require minimal decision-making and may be completed by performing a repetitive set of well-defined operations. As the processing and artificial intelligence (AI) capabilities of machines and software improve, the potential benefits of automating certain enterprise tasks scales.

For example, in the title insurance industry the title company completes a set of enterprise processes before issuing a title policy. Many of these enterprise processes follow a set of predetermined, rules-based tasks that may be suitable for automation such as, for example, collection of the policy holder's information, collection of data regarding the real property at issue, creation of a title file, and delivery of title documents and related documents (e.g., exception documents and maps). As another example, in the legal industry, many of the contracts that are generated follow a set of predefined, rules-based tasks such as, for example, collection of data regarding the parties to the contract, collection of data regarding the length of the contract, collection of data regarding predefined contract terms and conditions that do or do not apply, and creation of the contract.

Various embodiments of the technology disclosed herein are directed to a framework for editing, assigning, controlling, and monitoring multiple bots within an enterprise network, including bots that perform natural language processing. By implementing the technology disclosed herein, a number of benefits may be realized.

First, the technology disclosed herein provides an intuitive GUI, implemented through a bot controller, for monitoring and controlling, in real-time, multiple bot hosts within an enterprise. As the bot controller provides real-time control and logging of each of the process performed by each bot host, a user of a bot controller (e.g., an enterprise section manager) can optimally assign enterprise tasks to bot hosts in real-time (e.g., scripts for execution) and take quick corrective actions if the bot hosts run into any errors during script execution.

Second, the technology disclosed herein permits logical segmenting and assignment of a bot host pool (i.e., the total number of bot hosts in the enterprise that are available for bot controller use) by enterprise division, section, or some other logical division of the enterprise. In accordance with implementations described herein, bot hosts may be hosted by geographically remote, unmanned machines and they may automate any enterprise task (i.e., they may be enterprise task "agnostic") provided that they have the necessary software libraries, drivers, application credentials, and process automation scripts. In this manner, bot hosts may be made available to bot controllers in different enterprise divisions for task automation depending on the enterprise's current workloads across different divisions or sections.

Third, in some implementations bot hosts may execute scripts that utilize an intelligent instruction analyzer engine that allows interpretation of unstructured human instructions (i.e., "natural language" instructions). As further described below, the intelligent instruction analyzer engine may be trained to recognize keywords in the context of the enterprise tasks automated by the bot host (e.g., in the context of the executed scripts), which may further expand the number of enterprise tasks that may be automated by the bot hosts.

Further still, embodiments of the technology described herein enable optimal utilization of the enterprise workforce. Instead of performing enterprise tasks that are best suited for machine automation, enterprise workers may better focus their efforts on deploying, managing, and monitoring bots to complete different enterprise tasks in an efficient manner. Additionally, the tasks that are automated by bots may be completed with improved speed and accuracy.

These and other benefits that may be realized by the technology disclosed herein are further described below. It should be noted that although various embodiments described herein will be described in the context of the real estate industry, they need not be limited to this context. As will be appreciated from the disclosure, the technology disclosed herein may be implemented in any enterprise that would benefit from a framework for editing, assigning, controlling, and/or monitoring multiple bots within an enterprise network, including bots that may perform natural language processing.

FIG. 1 illustrates an example enterprise system in which embodiments disclosed herein may be implemented. The system includes an enterprise server system 10, an enterprise database system 20, internal API gateway 15, external API gateway 16, and web application proxy 25. Some or all components of systems 10 and 20, internal API gateway 15, external API gateway 16, and web application proxy server 25 may be implemented as a part of a single enterprise system. For example, data retrieval and communication may be performed along a common enterprise service bus or enterprise network.

In this particular implementation, enterprise server system 10 provides a plurality of web-based applications or modules 11-15 through internal application program interface (API) gateway 15. Modules 11-15, in various embodiments, further described below, may be used to control and monitor bots, assign scripts to bot hosts, assign credentials to bot hosts, and perform natural language processing. Additionally, modules 15 may provide web-based applications (e.g., internal enterprise applications) that may be accessed by bot hosts during automation of enterprise tasks. These web-based applications may include, for example, a title-order application, an address-validation application, an appraisal order application, or another web-based applications of the enterprise.

In implementations, an internal API gateway 16 may filter user traffic so that only authenticated or authorized users access modules 11-15, route requests by user devices to an appropriate module 11-15, provide an API tailored for each type of device so that the device may access a module, limit how much traffic may be sent by user devices, and provide other gateway services. For example, API gateway 16 may allow internal user devices 1 (e.g., devices on the enterprise's intranet or LAN) to access applications (e.g., web-based applications) provided by enterprise system 10. Some user devices 1 may be configured as bot controllers that access an application (e.g., bot controller module 11) for controlling and monitoring bot hosts that perform enterprise tasks. In some instances, the application may be provided as a browser based web application (e.g., instructions contained in a webpage), a mobile application, as a native-based application, or some combination thereof. The application may be accessed using a variety of frameworks, such as, for example, HTML 5, Angular JS, ASP.NET, WPF, MVVM, etc. In addition, as further described below, some user devices 1 may be configured as bot hosts that automate enterprise tasks by executing one or more scripts. In some instances, bots may access one or more of modules 14-15 during task automation.

Alternatively, in other embodiments an API gateway is not implemented and user devices may directly call modules 11-15 using the appropriate protocols (e.g., HTTP, WebSocket, etc.) Enterprise server system 10 may also provide a security server 18 (e.g., an Active Director Federation Services (ADFS) server) for providing users with sign-on access (e.g., user credentials) to applications provided by server system 10.

An external API gateway 17 may also provide a network access point to enterprise server system 10 for external user devices 2 such as devices that access the enterprise intranet through a VPN or devices operated by third parties or agents having a relationship with the enterprise. By way of example, user devices 2 may comprise a desktop system, a laptop, a tablet, a mobile phone, or any other system that may display and access applications (e.g., web-based applications) provided by enterprise system 10. In the example system of FIG. 1, a tablet or smartphone device may execute an application that calls a web application proxy server 25 for accessing modules 11-14.

As illustrated in this example, modules 11-15 include a bot controller module 11, a bot script management module 12, a bot credential management module 13, a natural language processing (NLP) module 14, and other web-based application modules. In embodiments, these modules may be implemented as separate or integrated web-based applications. For example, bot script management module 12 and bot credential management module 13 may be integrated into bot controller module 11.

Bot controller module 11 may be used to dynamically assign bot hosts to different enterprise tasks (e.g., by configuring the scripts run by the bot hosts), assign credentials to or remove credentials from bot hosts, monitor the activities of bot hosts, and perform other actions in relation to bot hosts, further described below. Bot script management module 12 may allow a user workstation (e.g., a workstation with an installed bot controller) to deploy scripts on the bot hosts to automate enterprise tasks. As further described below, bot hosts may be assigned the appropriate scripts to complete the required enterprise process. Bot credential management module 13 may allow a user workstation (e.g., a workstation with an installed bot controller) to manage the credentials of bot hosts that access software applications. For example, credentials for accessing web-based application modules 15 of the enterprise may be granted to or removed from a bot host.

Intelligent instruction analyzer module 14 may be used to parse human instructions and determine enterprise tasks that need to be performed based on the instructions. In some instances, a customer of the enterprise may provide additional instructions (e.g., via email) to perform an enterprise task or specific information to be included for further processing. These instructions may not follow a predefined format because they are written in the natural English language. In implementations, further described below, an intelligent instruction analyzer module 14 may be called by a bot host to interpret a customer's instructions in support of automating an enterprise tasks.

As illustrated, the example enterprise system also includes an enterprise database system 20 that includes a database for managing user account data (e.g., data of user accounts within the enterprise, including accounts of users associated with bot controllers or bot hosts), a database for managing customer data (e.g., customer names, customer addresses, and other relevant customer data), and one or more databases for managing bot host configuration data and keeping record logs of bot host activities.

Figure 2:
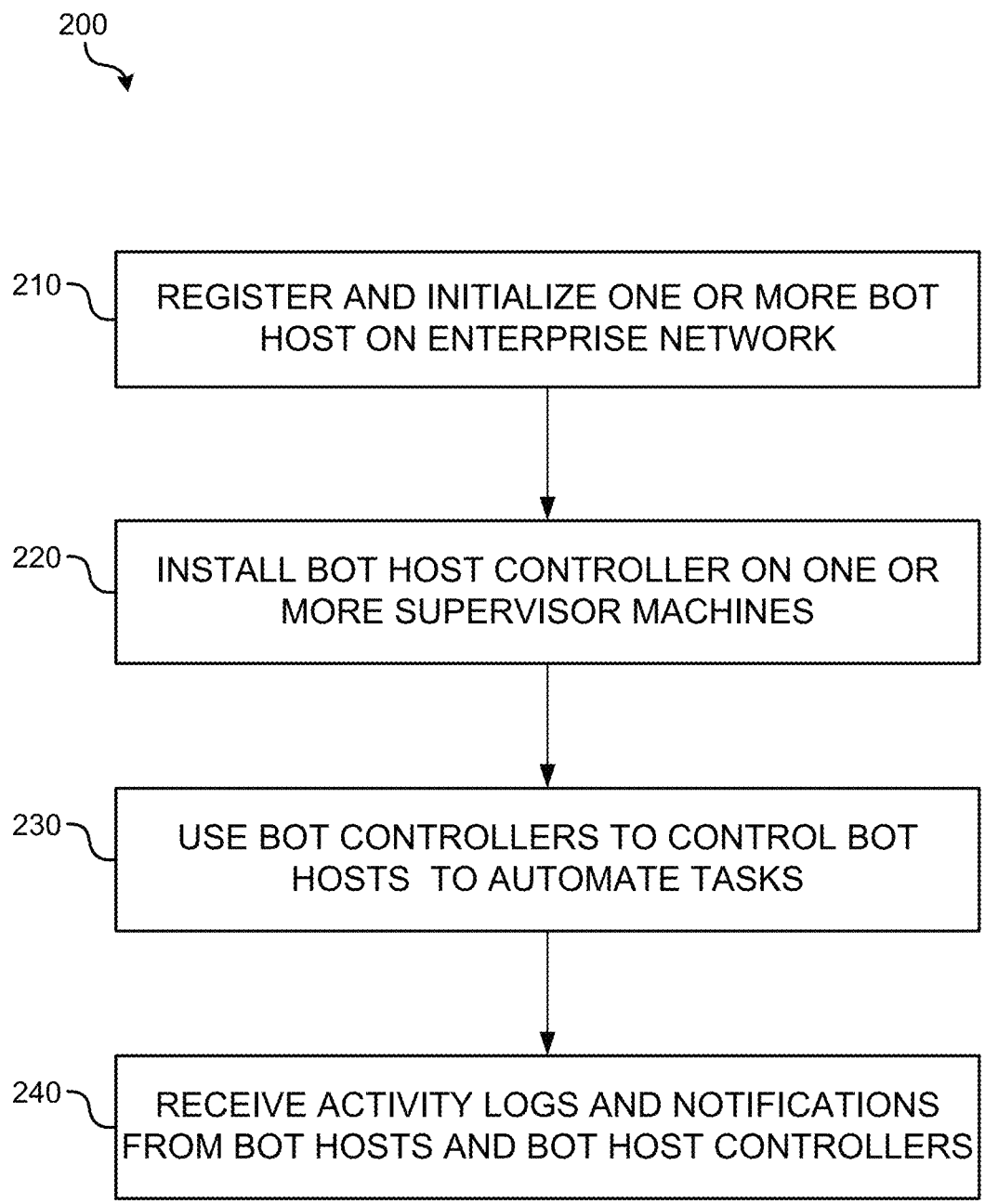
FIG. 2 is an operational flow diagram illustrating an example process that may be implemented by an enterprise system to initialize, control, and communicate with bot hosts in accordance with embodiments.

FIG. 2 is an operational flow diagram illustrating an example process 200 that may be implemented by an enterprise system (e.g., the system of FIG. 1) to initialize, control, and communicate with bot hosts in accordance with embodiments.

At operation 210, one or more bot hosts are registered and initialized on the enterprise network. Registration and initialization of the bot hosts may include assigning each bot host an IP address (e.g., an IP address within the enterprise intranet) and assigning each bot host a unique ID or name within the enterprise network. The initialized bot hosts may be hosted on virtual machines and/or physical machines such as unmanned remote machines (e.g., workstations or remote servers within the enterprise). In some implementations, a plurality of bot hosts may be hosted on a single physical machine. In other implementations, a single bot host may be hosted on a physical machine. In some implementations, all bot hosts may be configured to run on the enterprise private network.

Figure 3:
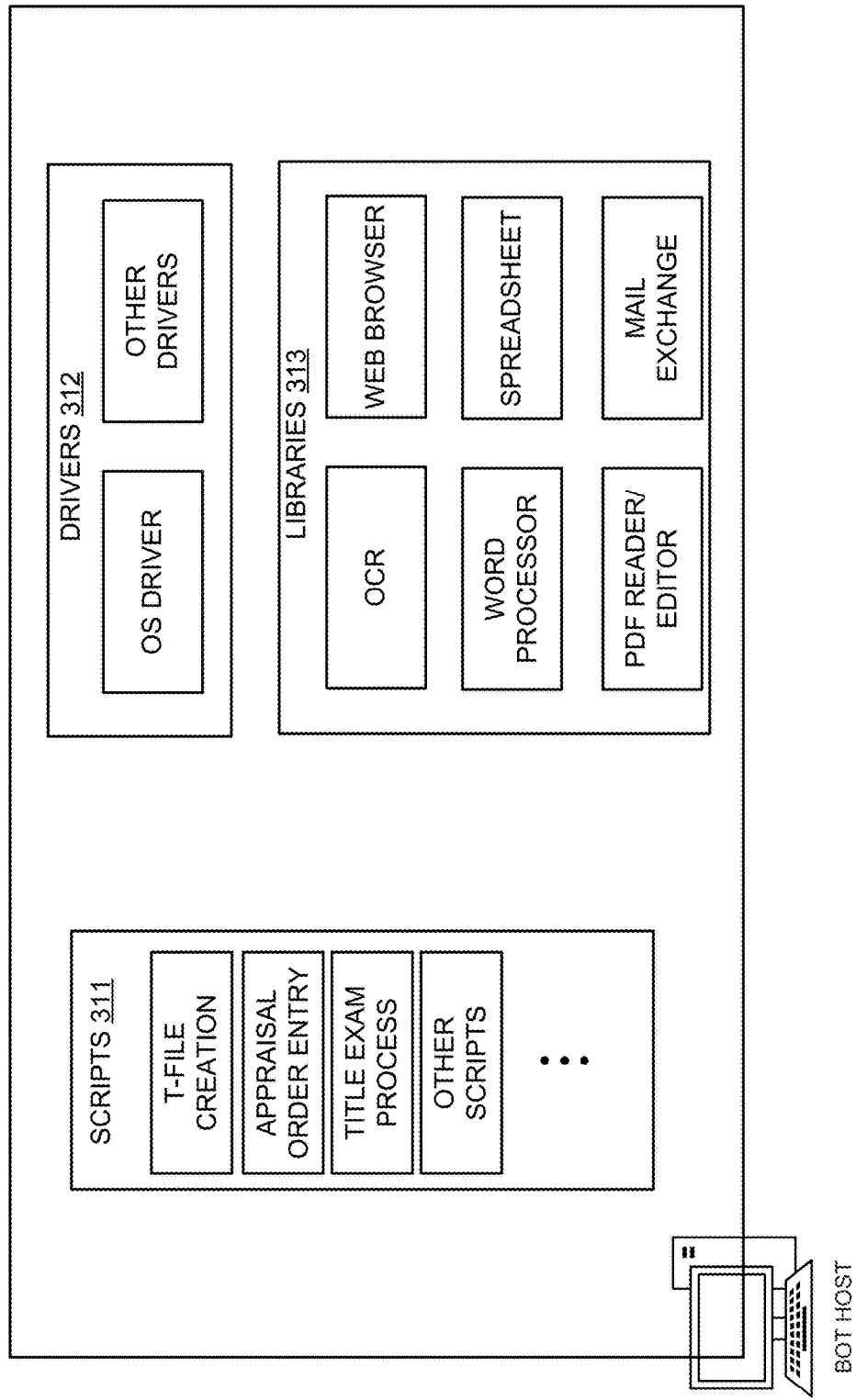
FIG. 3 illustrates an example configuration of a bot host after registration and initialization in an enterprise network in accordance with the method of FIG. 2.

Additionally, as illustrated by FIG. 3, registration and initialization of bot hosts 310 may include installing the necessary drivers 312 and software libraries 313 within each bot host machine such that the bot host may execute the necessary scripts 311 for automating particular enterprise tasks. For example, each bot host machine may be configured with an OCR software library, a web browser software library, a word processor software library, a spreadsheet software library, a PDF reader/editor software library, and/or a mail exchange software library. Additionally, each bot host machine may be configured with an operating system driver, a network interface driver, and other drivers to enable communication between the host machine's hardware components and the software components and operating system of the host machine.

Additionally, one or more scripts 311 may be stored in each bot host machine during initialization. Over time, these scripts may be revised and/or additional scripts may be added. For example, each bot host may be configured to validate a current version of a script, and notify a user on the enterprise network if it is out of date and a newer version needs to be installed. The binaries for the updated script may then be distributed through a web installation package. In implementations, scripts 311 can be developed from software test automation libraries that are used to automatically test software applications. The bot hosts may be agnostic to the particular software test automation libraries that are utilized and thus any software test automation library (e.g., open source libraries) may be used to develop scripts over time to automate enterprise tasks.

In the real estate context, illustrated by the example of FIG. 3, each bot host may be able to execute a script for creating title files (T-file), a script for creating appraisal order entries, a title examination process script, and other scripts. By way of example, consider a script for creating appraisal order entries. In this context, when the bot host executes the script, it may monitor an inbox of a mail exchange application for emails, including parsing those emails for any incoming appraisal order requests received by email from a client. In the email request, the bot host may identify the name of the client based on the sender field and/or the body of the email, access the client's website using a web browser application, and login to the website using the appropriate credentials. Once logged in, the bot host may download the appraisal order details from the client's website and auto key in the details in an appraisal application that assigns the appraisal to a human. As the foregoing example illustrates, a bot host may interact with a variety of applications (e.g., mail exchange, web browser, and enterprise application for appraisal orders) by executing a script. In some instances, the bot host may also query a natural language processing (NLP) engine as it executes the script, such as in the case of parsing and interpreting emails. Example applications of bot hosts applying NLP are further discussed below.

Referring again to method 200, at operation 220 a bot controller may be installed or otherwise made available on one or more supervisor machines to monitor and control any registered bot hosts. In some implementations, the bot controllers may be accessed using a web-based interface provided through a web server. The web-based interface may be provided through an application locally installed on a supervisor's workstation and/or using a web browser. For added security, a bot controller application may only be made accessible if the user machine is on the same network as the enterprise intranet.

In some implementations, a bot controller's control over bot hosts may be restricted by enterprise division. For example, a bot controller may only be able to monitor and control bot hosts within its division. In some implementations, bot controller access rights to bot hosts may be hierarchical, with higher-level users (e.g., executives, division managers, etc. . . . ) having a greater ability to monitor and control all bots within a division or the entire enterprise. In some implementations, a bot controller may be granted a "read-only" view of bot host tasks, where bot hosts may be monitored for task performance but not controlled.

In implementation where multiple bot controllers may monitor and control the same bots (e.g., bot controllers installed on supervisor workstations in the same enterprise division), the bot controllers may provide an indication of when a bot host is under the control of another bot controller and "locked" from use. In such implementations, bot controllers may be provided with a "read-only" view of the current status of "locked" bot hosts.

In some implementations, bot controllers may monitor and control bots that are in disparate geographical areas, including locations that are geographically remote from the bot controller. As such, a bot host may be deployed in any geographical location, even a different country of origin than the bot controllers that control it.

As the foregoing description illustrates, the deployment of bot hosts and corresponding bot controllers within the enterprise, including their associations (i.e., which bot hosts each bot controller may monitor and/or control), may depend on factors such as the number of distinct enterprise divisions, current task workloads within different divisions of the enterprise, available computing resources, and other factors.

At operation 230, the bot controllers may be used to control the bot hosts to automate one or more enterprise tasks. For example, as further described below, a bot controller may be used by a user to dynamically assign bot hosts to different enterprise tasks (e.g., by configuring the scripts run by the bot hosts), assign credentials to or remove credentials from bot hosts, and monitor in real-time the tasks performed by bot hosts. At operation 240, activity logs and/or notifications may be received in real-time from bot hosts and/or bot controllers. In addition to facilitating troubleshooting and configuration of the bot hosts in real-time, logging each of the processes performed by each bot host may create an audit trail and help ensure regulatory compliance by the enterprise.

Figure 4:
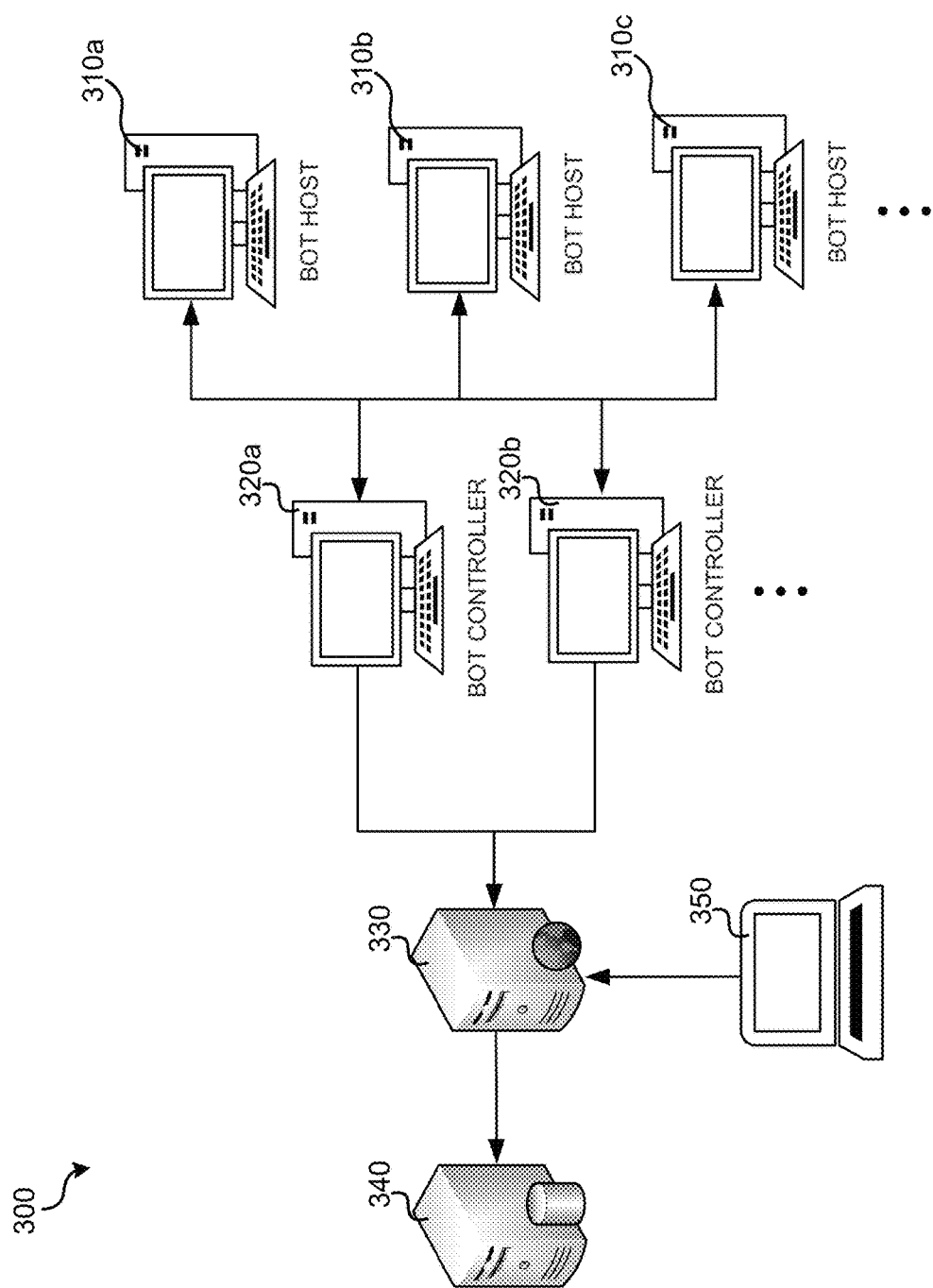
FIG. 4 illustrates an example configuration and architecture of a portion of an enterprise system after performing the method of FIG. 2.

FIG. 4 illustrates an example configuration and architecture of a portion of an enterprise system 300 after performing method 200. As illustrated, a plurality of installed bot controllers 320a-320b control and monitor a plurality of bot hosts 310-310c that have been registered with the enterprise network. For example, a plurality of supervisor workstations with installed bot controllers may cause bot hosts running on unmanned workstations to execute different scripts to automate enterprise tasks. Bot controllers 320a-320b may also monitor bot host activities in real-time, including receiving message notifications of actions performed by each bot host.

Bot controllers 320a-320 and bot hosts 310a-310c may communicatively couple to a web services gateway 330 that provide application services through one or more web servers. For example, the web services gateway 330 may provide applications such as a bot dashboard application for monitoring and/or controlling bot hosts, an application for gathering bot host status information directly from bot hosts and/or bot controllers, and an intelligent instruction analyzer engine. Also illustrated in the example of FIG. 4 is a database server 340 that may save activity logs for all bot hosts 310a-310c along with all current configurations for bot hosts 310-310c (e.g., assigned enterprise tasks, available scripts, bot host ID, etc.). In some instances, workstations 350 may communicatively couple to a web services gateway 330 to access a bot dashboard that provides read-only access (e.g. monitoring services) for bot hosts 310-310c.

Figure 5:
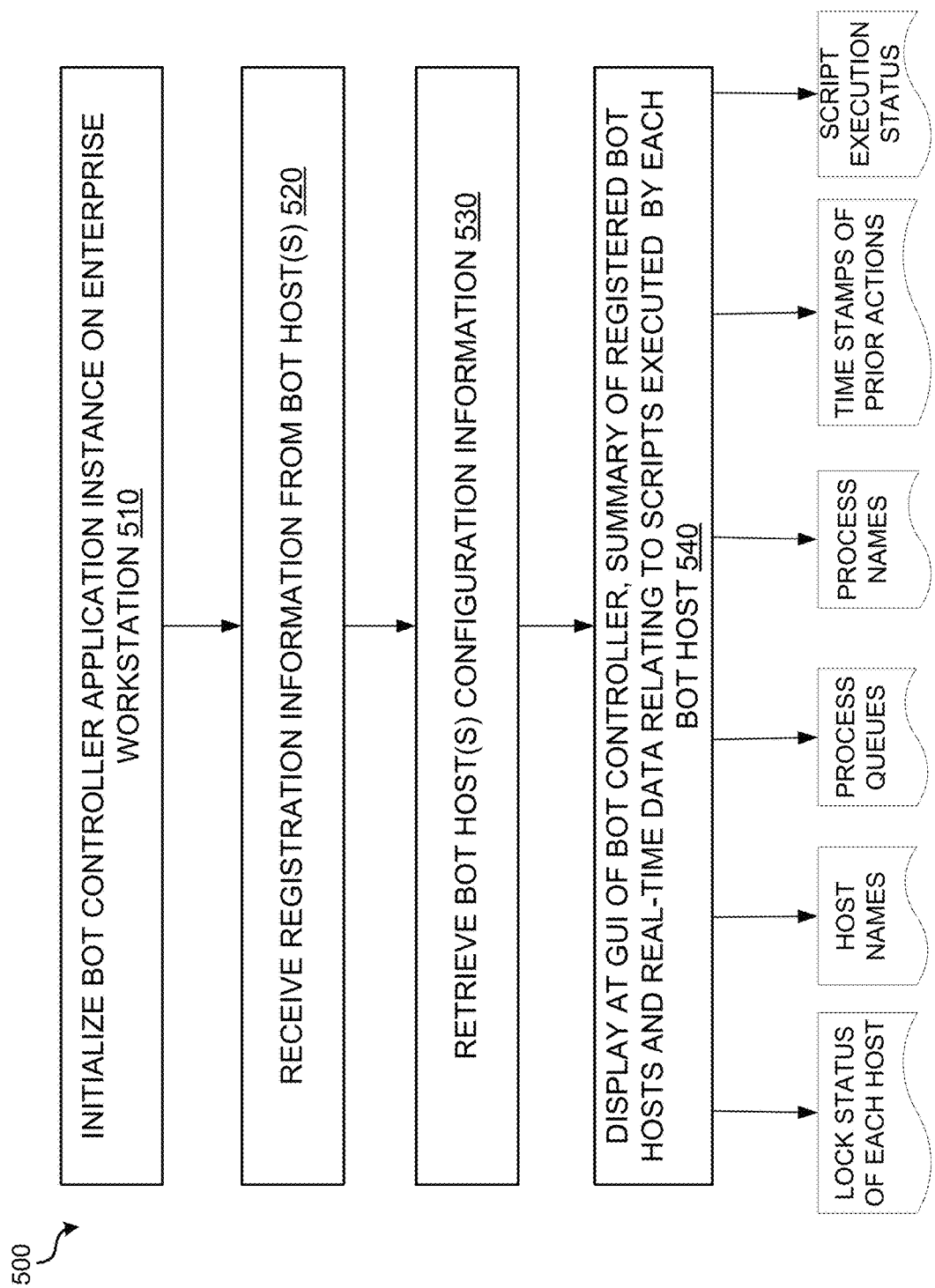
FIG. 5 is an operational flow diagram illustrating an example process that may be implemented to monitor bot hosts at a workstation running a bot controller application in accordance with embodiments.

FIG. 5 is an operational flow diagram illustrating an example process 500 that may be implemented to monitor bot hosts at a workstation running a bot controller application in accordance with embodiments. At operation 510, an instance of the bot controller application may be initialized on an enterprise workstation. For example, an instance of a web-based bot controller application locally installed on a user's workstation may be initialized. The bot controller may run as a background process (e.g., in a tray mode), without interfering with the activities of the user of the workstation. Additionally, the bot controller may be configured to pop out to notify the user of important events, such as warning or error notifications received from bot hosts such that quick corrective actions may be taken if there are problems with a bot host.

Following initialization of the bot controller, at operation 520, the bot controller receives registration information from one or more bot hosts. The registration information may include an IP address and networking port associated with the bot host, a list of bot scripts currently installed on the bot host machine, an identification of a user in the enterprise network that initiated the bot host, and an identification of the time that the bot host was initiated.

In implementations, when a bot host is first initialized, it registers itself with a server (e.g., through a web services gateway 330). Thereafter, when a bot controller application instance is initialized, a notification may be sent to the server, which is broadcasted by the server to all of the registered bot hosts. After receiving the broadcast, a bot host may directly initiate the registration process with the bot controller. For example, if the bot host is configured to operate in the same enterprise division as the bot controller, it may directly initiate the registration process with the bot controller, including transmitting registration information.

In implementations, the bot controller may receive registration information for all bot hosts in the enterprise, or registration information for a subset of bot hosts in the enterprise (e.g., bot hosts corresponding to the enterprise division of the bot controller's workstation). For example, bot hosts in the same enterprise division as the controller may register themselves with the bot controller such that they may follow the commands issued by the bot controller.

At operation 530, the bot controller may retrieve configuration information for each of the bot hosts. For example, the bot controller may retrieve configuration information by querying a web services gateway 330 communicatively coupled to a database server 340 storing the current bot host configurations. The retrieved bot host configuration information may include, for example, OS/domain credentials utilized by the bot host to access shared enterprise resources (e.g., shared folders, Sharepoint content, etc.), login credentials utilized by the bot host to access different applications (e.g., web-based enterprise applications), email distribution lists utilized by the bot host to send out notifications specific to automation scripts, etc.

At operation 540, the GUI of the bot controller may display summary data regarding each of the registered bot hosts, and real-time data relating to scripts executed (e.g., scripts currently being executed or available for execution) by each of the bot hosts. For example, the GUI may display data regarding the name of each bot host or its associated workstation, a lock status of each bot host, process task queues providing a count of a number of requests in the queue for an automation script, process task names of scripts currently being executed by each bot host, time stamps of prior actions and/or scripts executed by each bot host, a status of scripts being executed by each bot host, and other data.

In implementations, operations 520-540 may be performed each time a bot controller application instance is initialized by a user. Additionally, operations 520-540 may be iteratively performed (e.g., every few seconds, minutes, or hours) or performed in response to user input at the bot controller GUI. In this manner, the bot controller GUI may display real-time information and updates regarding the current status of bot hosts, including any changes to bot hosts that were made by other bot controllers.

Figure 6A:
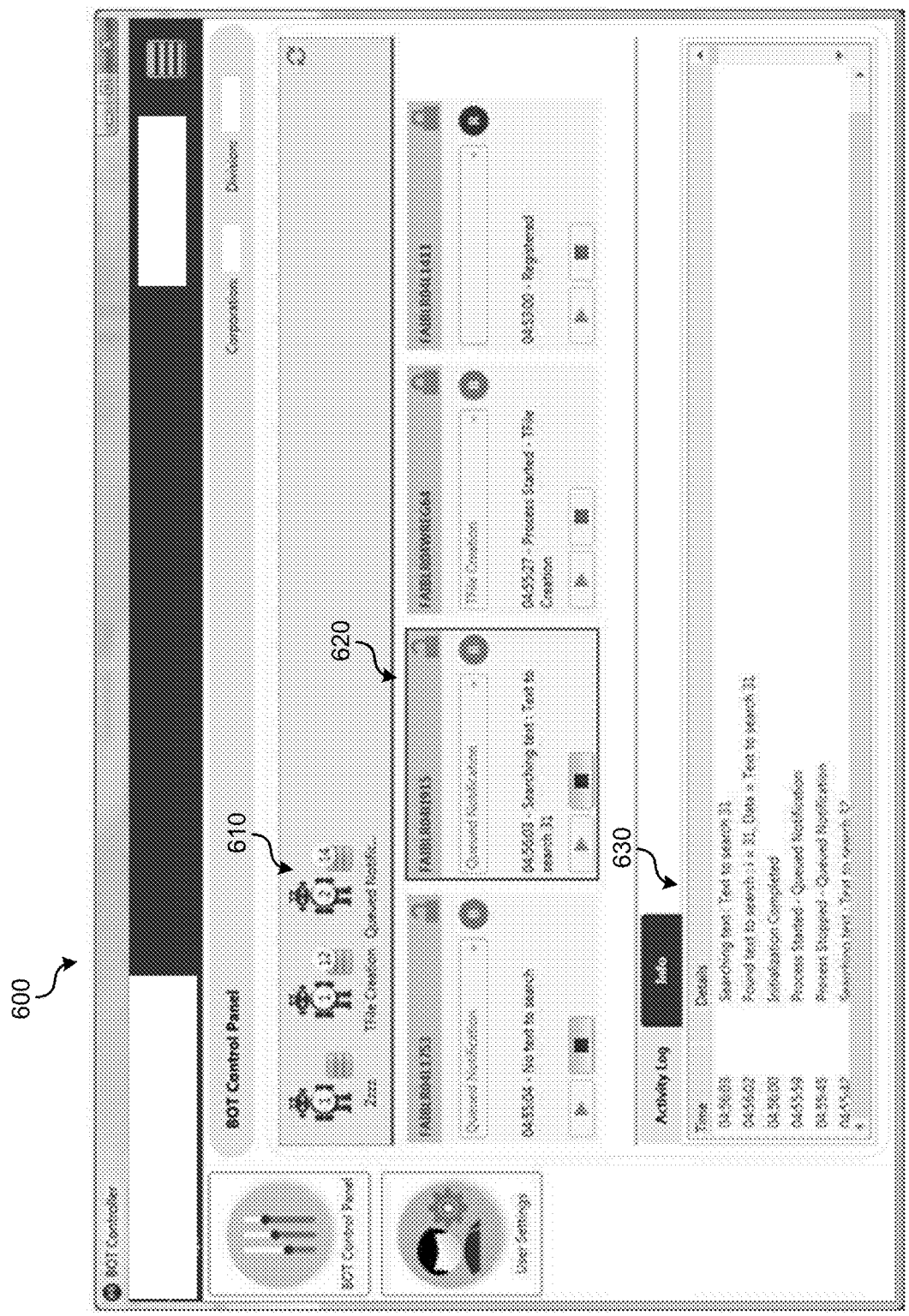
FIG. 6A illustrates an example graphical user interface (GUI) of a bot controller that may be used to control and monitor bot hosts in accordance with embodiments.
Figure 6B:
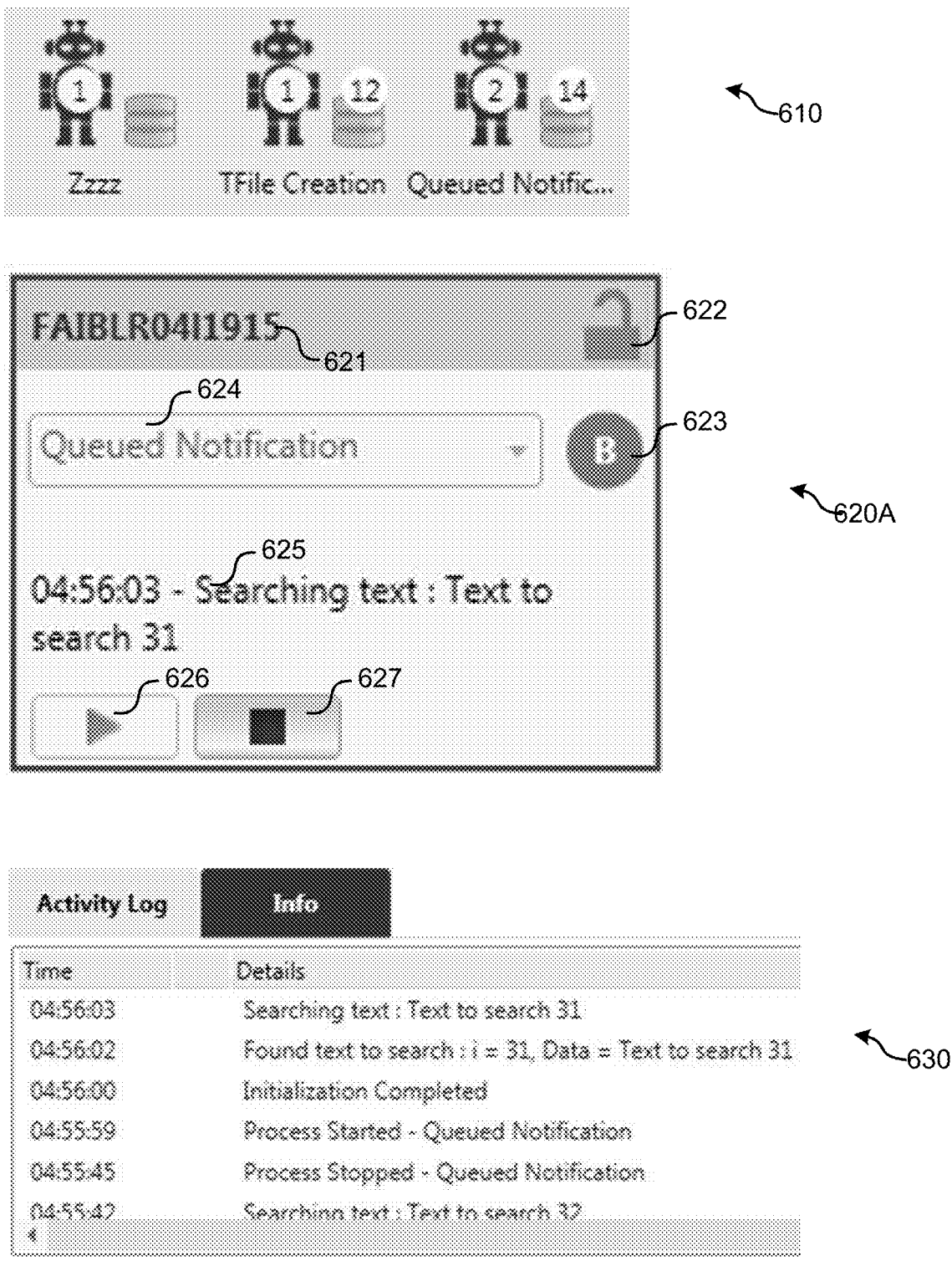
FIG. 6B illustrates an example GUI of a bot controller that may be used to control and monitor bot hosts in accordance with embodiments.
Figure 6C:
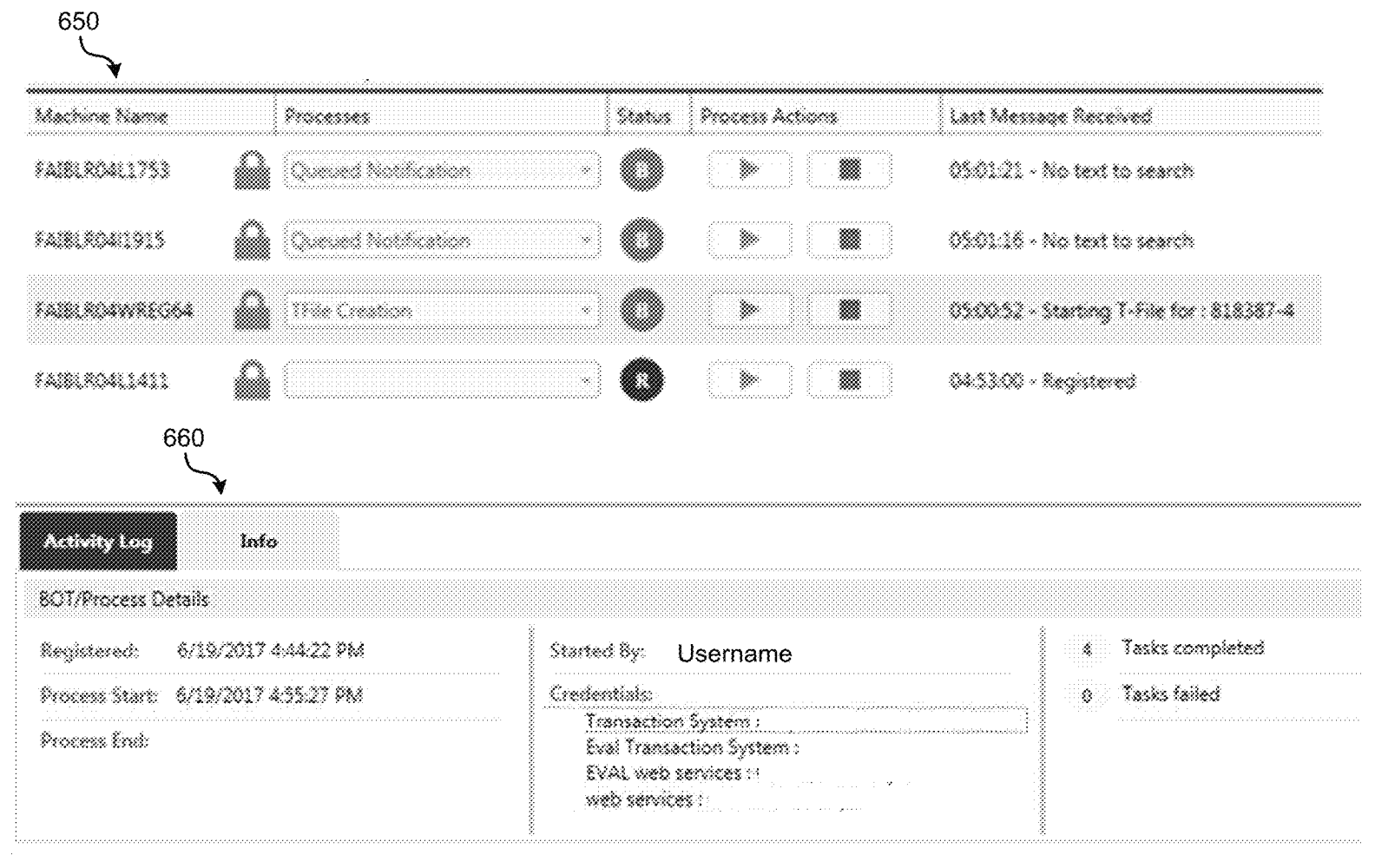

FIGS. 6A-6C illustrate an example GUI 600 of a bot controller that may be used to control and monitor bot hosts in accordance with embodiments. The bot host data displayed by exemplary GUI 600 may be displayed by performing the process steps of method 500. As shown by FIGS. 6A-6B, the GUI may include a bot control panel that displays a summary section 610 of bot hosts currently executing processes, a script execution status section 620 for individual bots, and a bot host activity log section 630.

Summary section 610, in the example of FIGS. 6A-6B, displays the number of bots that are executing different processes along with the number of items pending in the process queue to be taken up by the bots. For example, the second bot host is running a T-File creation process script and has twelve different T-File creation requests in the queue for the bot to process. The third bot host is running a queued notification process script and has fourteen different queued notification process requests in the queue to process.

During operation, the bot scripts can be configured to monitor various queued enterprise tasks, including an application specific workflow queue, email queue, FTP Location, MSMQ queue and database queue for task intake. A bot may select tasks from any of these queues and complete the enterprise process. For example, one bot may be programmed to monitor a particular email account to identify enterprise tasks and another bot may be programmed to monitor a web-based enterprise application (e.g., in a webpage) to identify new enterprise tasks.

Script execution status section 620, in the example of FIGS. 6A-6B, displays a status of each bot host running on a remote machine. As illustrated, script execution status 620 may display a plurality of tiles 620A, each tile providing information for each registered bot host. Caption 621 displays a host name of the machine or workstation hosting the bot. Graphic 622 displays a lock status of the particular bot (in this example, as a lock icon), indicating whether the user of the bot controller may access the particular bot at that time. For example, if the icon shows that the bot is "locked" from use, then another user running a bot controller instance may be currently controlling the bot host. By contrast, if the icon shows that the bot host is "unlocked" from use, then the bot host may control the bot host.

Graphic 623 displays a script execution status of the bot host. For example, graphic 623 may indicate that the bot host is busy executing a process automation script (e.g., "B"), ready or available to execute a process automation script (e.g., "R"), or that an error has occurred with the bot host such as no updates being received from the bot host for a while (e.g., "E"). Drop down menu 624 provides an indication of a process automation script currently being executed by the bot host. Notification 625 provides a textual notification of the last message received from a bot host, including its timestamp. Controls 626-627 provide means for starting and stopping the execution of scripts by the bot host if the bot host is unlocked.

In some implementations, users may be provided with the option of viewing the information regarding each registered bot host in a list format. FIG. 6C illustrates one such example of a list format 650 for viewing bot hosts. In other implementations, information for each of the registered bot hosts may be displayed in other graphical formats besides a tiled view or list view.

Bot host activity log section 630, in the example of FIGS. 6A-6B, displays an activity log for a bot host currently selected by the user (e.g., the highlighted bot host tile shown in FIG. 6A). In this example, the activity log includes a chronologically ordered, scrollable list of messages generated by the selected bot host during process execution, including a timestamp for when each message was generated. For example, the activity log may display messages relating to actions such as when a text search was started and/or completed, when a script process was started, when a script process was completed, and other actions. In implementations, the activity log messages may be customized by the bot hosts depending on requirements of the processes being executed by the bot hosts. In some implementations, bot host activity log section 630 may be configured to display messages from a plurality of bot hosts (e.g., in response to user input selecting multiple bot hosts at the GUI) or from all available bot hosts.

Also illustrated in the example of FIG. 6A is a tab for switching from the activity log to an information summary for the selected bot host. FIG. 6C illustrates one such example of an information summary 660 of a selected bot host. As illustrated, the information summary shows when the bot host was registered with the bot controller, when the bot host began executing a process, when the bot host finished executing a process, an identification of the user who started the bot host, credentials currently being utilized by the bot host to access applications (e.g., internal web applications provided by the enterprise), and a number of tasks completed by the bot host.

Figure 6D:
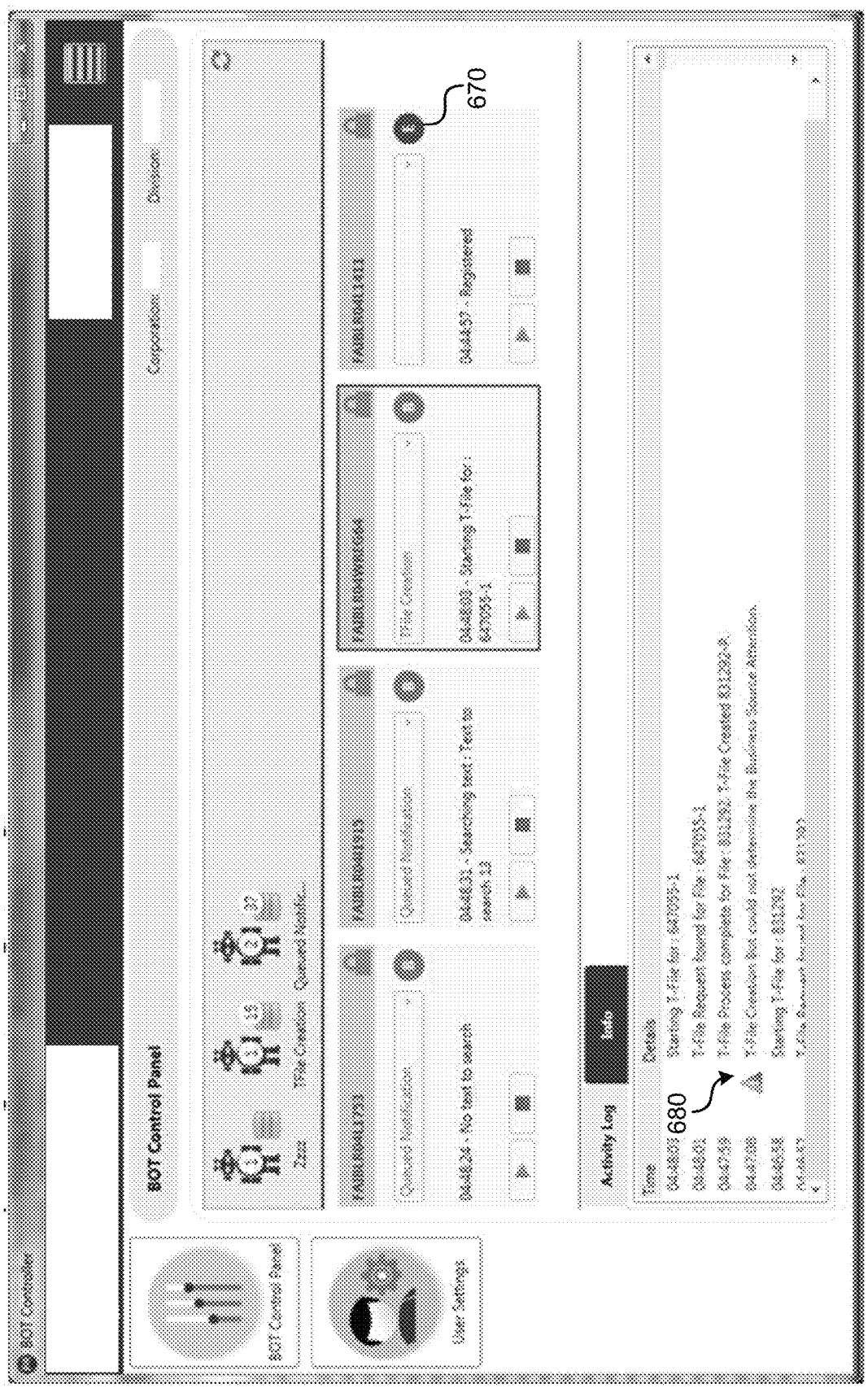
FIG. 6D illustrates an example GUI of a bot controller that may be used to control and monitor bot hosts in accordance with embodiments.

FIG. 6D illustrates another example display of GUI 600 during performance of methods in accordance with the disclosure. As shown in this example, an error graphic 670 indicates that an error has occurred with one of the bot hosts. Additionally, the activity log includes a notification warning message 680 that was generated during execution of a script on a bot host.

Figure 6E:
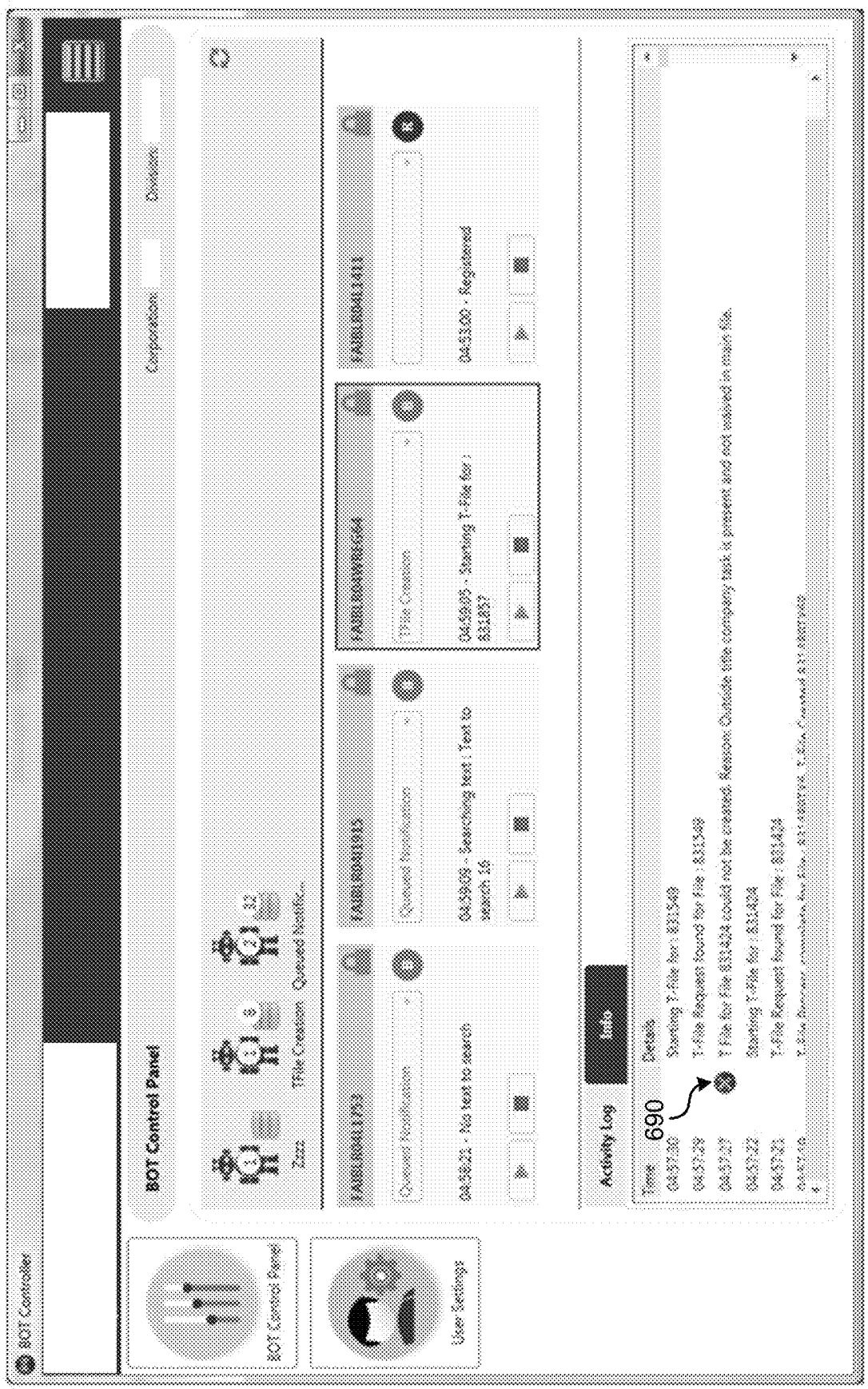
FIG. 6E illustrates an example GUI of a bot controller that may be used to control and monitor bot hosts in accordance with embodiments.

FIG. 6E illustrates another example display of GUI 600 during performance of methods in accordance with the disclosure. As shown in this example, the activity log includes an error message that was generated during the bot host's failure to successfully execute a script. In this example, error message also displays the cause of the failure.

Figure 7:
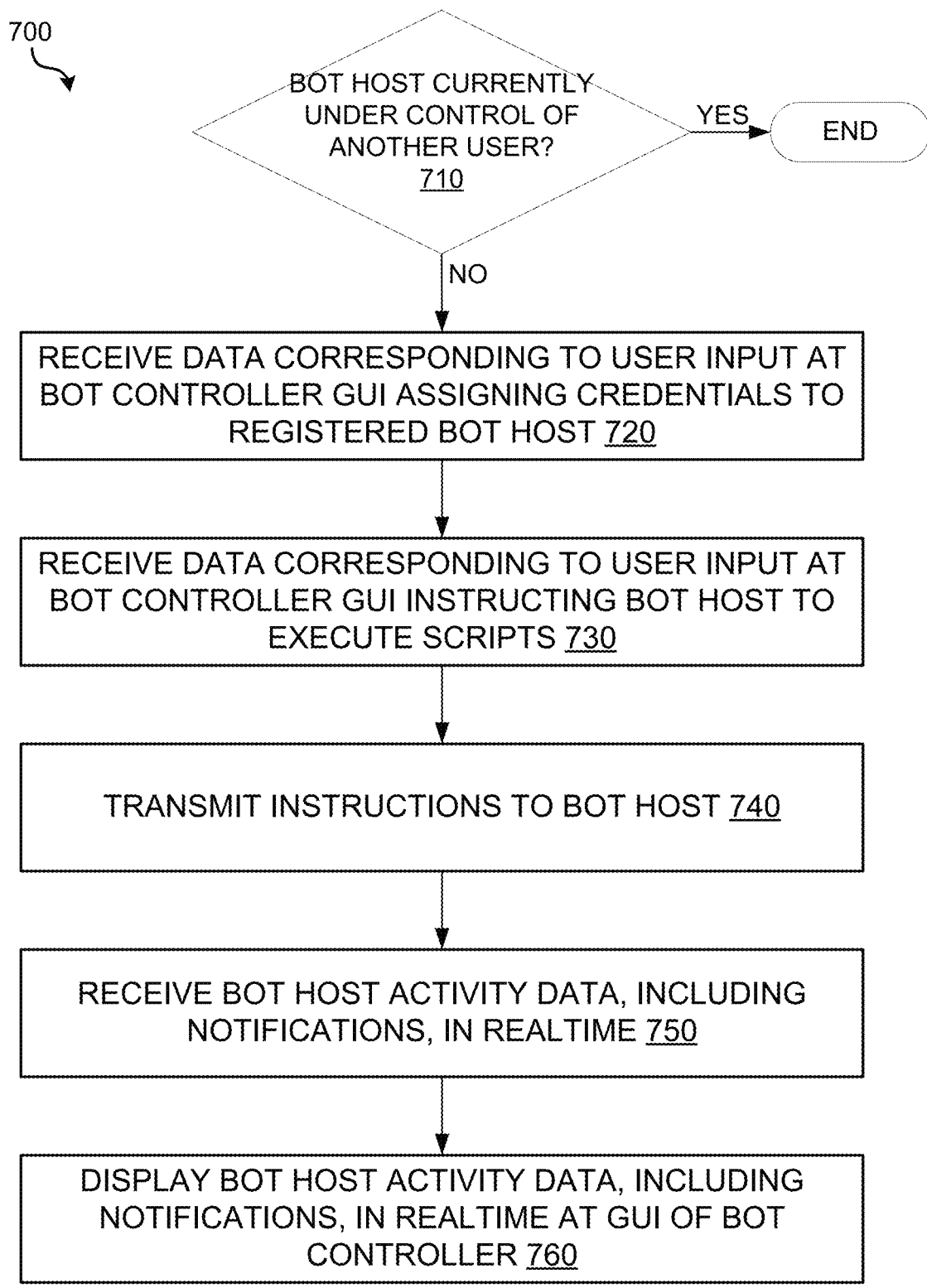
FIG. 7 is an operational flow diagram illustrating an example process that may be implemented to control a bot host at a workstation running a bot controller application in accordance with embodiments.

FIG. 7 is an operational flow diagram illustrating an example process 700 that may be implemented to control a bot host at a workstation running a bot controller application in accordance with embodiments. For example, process 700 may be implemented using a bot controller GUI 600. Process 700 will be described in conjunction with FIGS. 8-9, which illustrate example displays of GUI 600 during implementation of process 700.

At decision 710, the bot controller may determine if a bot host is currently under the control of another user (e.g., another bot controller application instance being run by another supervisor workstation). When a user of the bot controller attempts to assume control over a bot host (e.g., by clicking a lock icon of a bot host), a message may be transmitted from the bot controller to the bot host requesting access to the bot host. In response to the request, the bot host may respond with a notification regarding its lock status. For example, if no other bot controllers currently have access to the bot host, the bot host may notify the bot controller that the request was successful. Otherwise, if another bot controller is currently accessing the bot host, the bot host may notify the bot controller that the request was unsuccessful and optionally provide details regarding the bot controller application and/or user controlling/accessing the bot host at the time the request was made. As the foregoing example illustrates, individual bot hosts may grant or release exclusive access to bot controllers.

Figure 8:
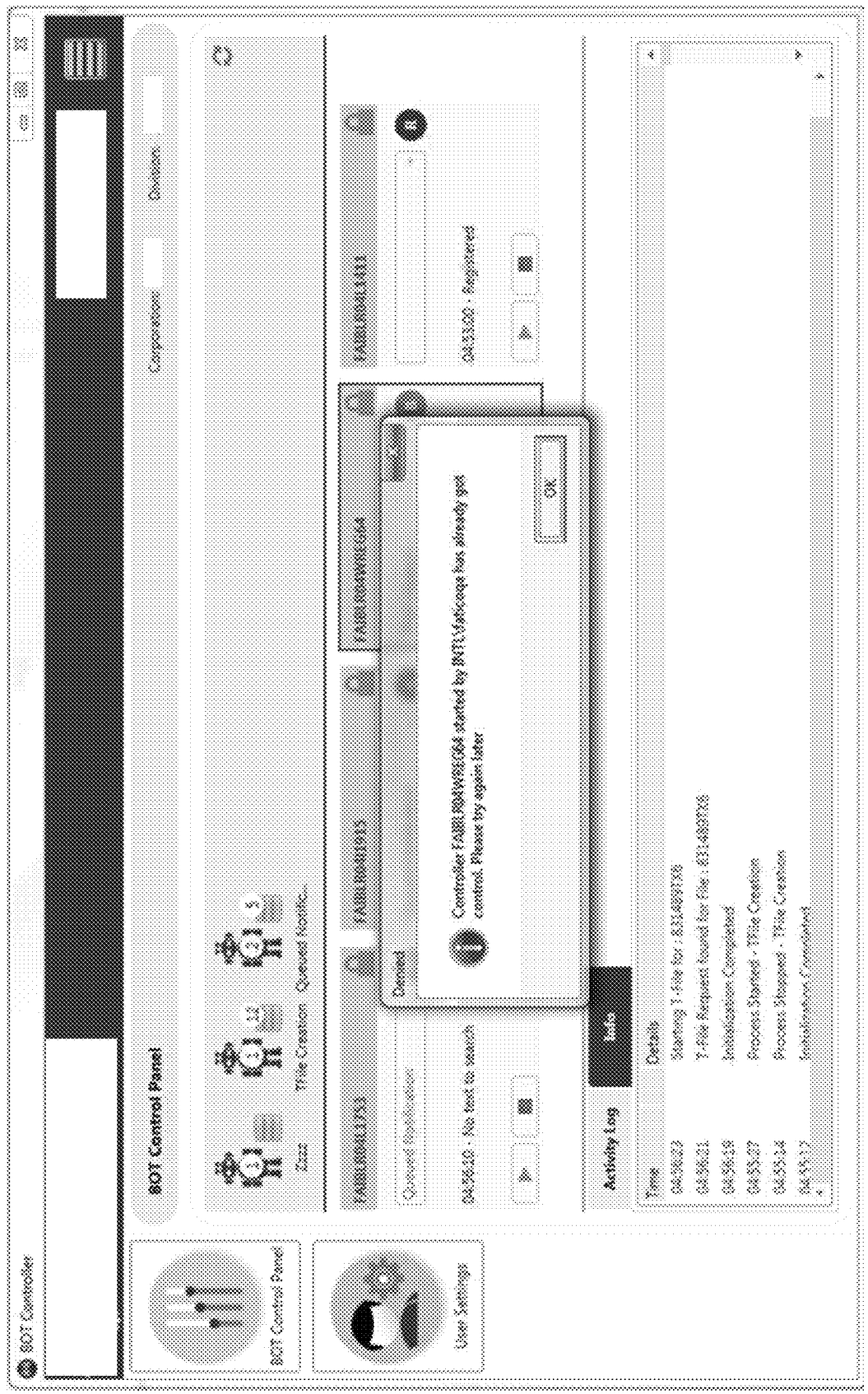
FIG. 8 illustrates an example GUI of a bot controller displaying a message indicating that another user is currently controlling a bot host.

For example, if the bot host is currently under the control of another user, a graphic 622 may indicate that the bot host is locked from use. Additionally, if the user of the bot controller attempts to assume control over a bot host that is currently under the control of another user, the GUI of the controller may display a message indicating that another user is currently controlling the bot host. One such example of a message that may be displayed is illustrated by FIG. 8. In some implementations, if the bot host is under the control of another user, the bot controller may be used to request control over the bot host from the other user.

At operation 720, the bot controller may receive data corresponding to user input at the bot controller GUI assigning application credentials to the registered bot host. The assigned application credentials in various implementations, may include login names and passwords that are associated with one or more applications within the enterprise (e.g., web-based applications) that are accessed by the bot host during execution of one or more scripts.

Figure 9:
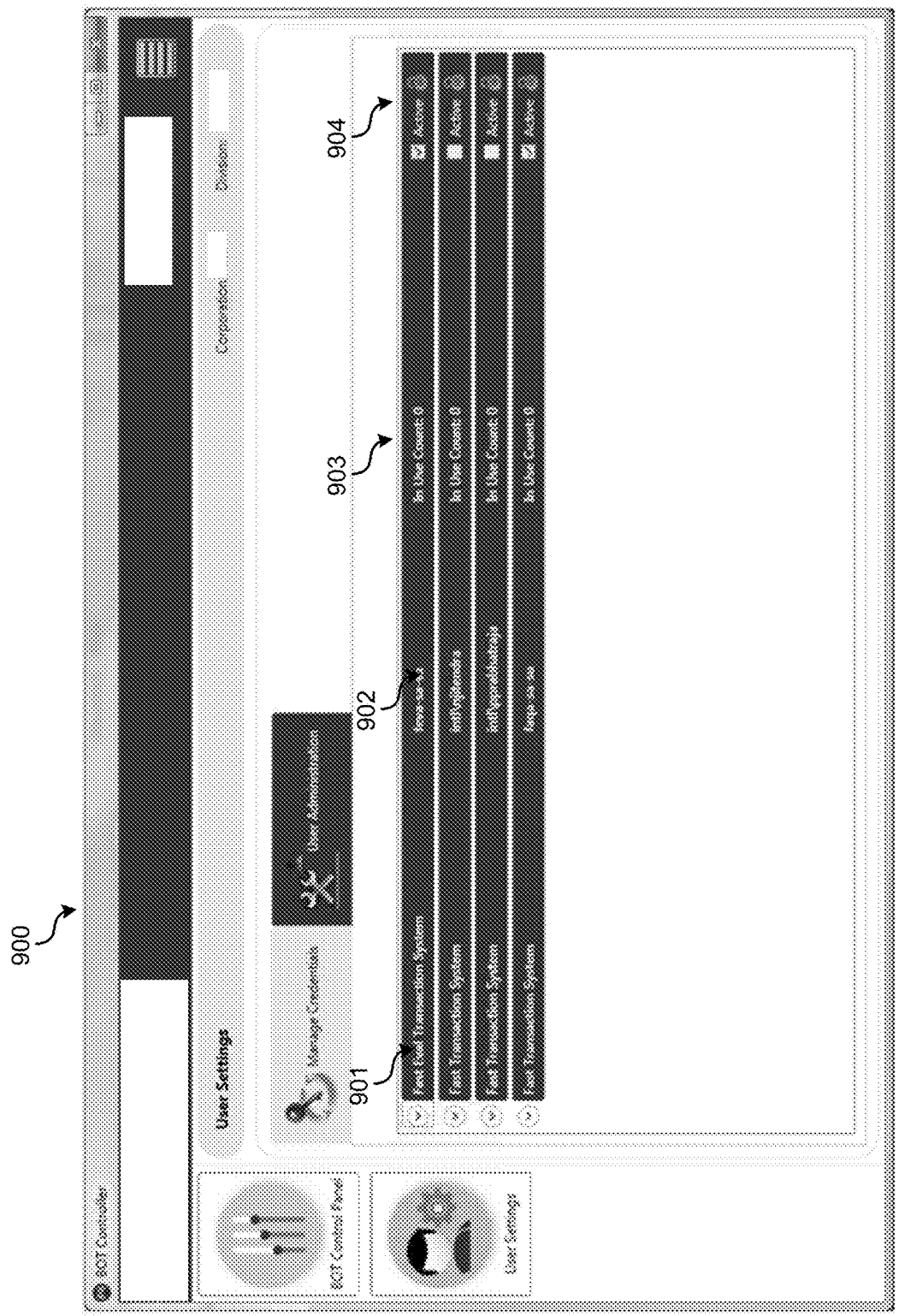
FIG. 9 illustrates an example GUI of a bot controller displaying an interface for modifying credentials of one or more bot hosts.

As illustrated in the example of FIG. 6A, a user of the bot controller GUI may select the user settings control, which may bring up an interface for managing credentials of each of the available bot hosts. FIG. 9 illustrates one such example of an interface 900 that may be displayed by the GUI of the bot controller. As illustrated, the interface displays an application 901 with which a credential is associated with (e.g., a web-based application of the enterprise), a login user name 902 that may be used by the bot host to access the application, an indication 903 of whether the application credential is currently in use, and a control 904 for activating or deactivating the configured credential for use by the bot host.

At operation 730, the bot controller may receive data corresponding to user input at the bot controller GUI instructing the bot host with assigned credentials to begin executing one or more scripts to automate enterprise tasks. For example, as illustrated in the example of FIG. 6B, a user of the bot controller GUI may select a script from drop down menu 624 and select a control 626 that instructs the bot host to begin executing the script. Thereafter, the instructions may be transmitted to the bot host at operation 740.

User selections or actions at the bot controller GUI may be sent to bot hosts in the form of messages that may be interpreted by the bot hosts that are programmed to handle such messages. For example, for an instruction to start a process script, a bot host may identify what script should be started, load an appropriate shared library (e.g., a binary dynamic-link library (DLL), and initiate processing by executing the script. As another example, for an instruction to stop a process script, the bot host may forward or delegate a message received from the controller to the bot script to take action (e.g., stop execution).

Where changes are required to scripts, the scripts may be reprogrammed to match the changes and deployed as discussed above with reference to FIG. 2 (e.g., through a web installation package).

By way of example, a bot host may be instructed to begin executing a script for creating a title insurance order. Such a script may cause the bot host to search through a title insurance order information sheet and supporting documents (including performing OCR of these documents, if required) and extract key information/fields (e.g., seller name, a buyer name, property information, or other information that is required to create the title insurance order) from the order sheet and supporting documents. Additionally, execution of the script may cause the bot host to enter the extracted information into the appropriate fields of a web-based application (e.g., one accessed with assigned credentials) for further processing.

At operation 750, the bot controller may receive bot host activity data relating to the executed script, including notifications, in real-time. For example, once a bot controller and bot host are connected (during registration), notifications from bot hosts may be dynamically sent or broadcast to all connected bot controllers (i.e., all bot controllers with which the bot host has been registered). These notifications may reflect the current status of a bot host. In some implementations, as a mechanism for handling failed messages and reconciling a local list, a bot controller may periodically refresh a list of bot hosts using a centralized server cache, and/or a bot host may periodically refresh a list of bot controllers using a centralized server cache. For example, a notification message transmitted from a bot host at the time of startup may be lost due to some error in the enterprise network. In such cases, the bot controller may learn of such a bot host by periodically refreshing the list from the server cache at a set interval.

At operation 760, the bot controller may display the bot host activity data, including the notifications, in real-time at the GUI. For example, As illustrated by the example of FIGS. 6A-6B, the bot controller may display an activity log 630 including a chronologically ordered, scrollable list of messages generated by the selected bot host during execution of the script, including a timestamp for when each message was generated. Additionally, as illustrated by the example of FIGS. 6A-6B, a tiled window 620 for the bot may also display a most recent message notification generated by the bot host during execution of the script.

Figure 10:
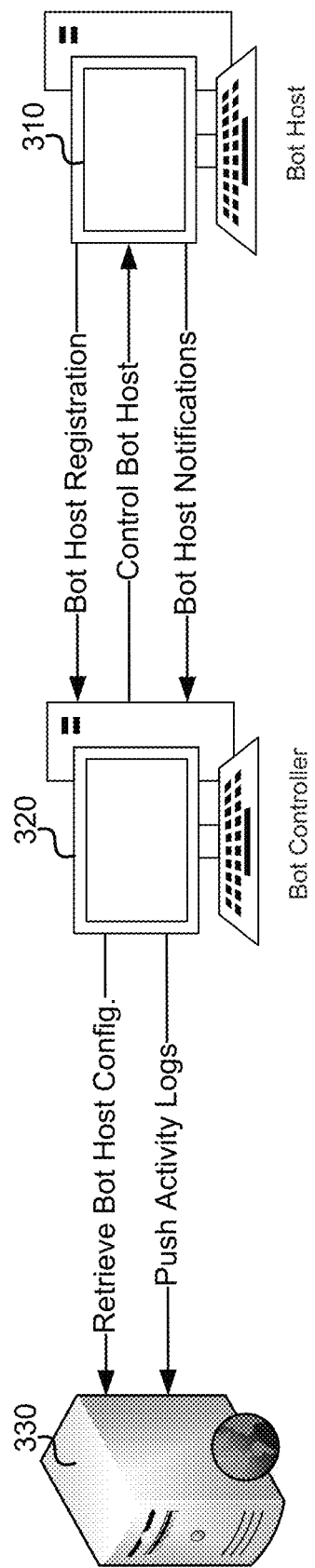
FIG. 10 is a diagram illustrating an example communication flow of a bot controller with a registered bot host and a web services gateway over an enterprise network during implementation of the methods described herein.

FIG. 10 is a diagram illustrating an example communication flow of a bot controller 320 (e.g., one of the bot controllers of system 300) with a registered bot host 310 and a web services gateway 330 over an enterprise network during implementation of the methods described herein. As illustrated, the bot host 310 registers with bot controller 320 to enable communications in real-time. Following registration, the bot controller 320 may control the bot host in real-time and receive notifications from the bot host in real-time. The received notifications may be displayed as an activity log, described above. Regarding communication with web services gateway 330, bot controller 320 may push the generated activity logs or notifications received from bot host 310 to web services gateway 330. These logs may then be stored in a database server. In implementations, these activity logs may be pushed in real-time and made accessible to other bot controllers on the enterprise network, thereby providing a real-time record of all relevant bot host activities. Bot controller 320 may also retrieve, in real-time, configuration information for bot host 310 that was set by other bot controllers or other users (e.g., during initialization and registration of bot host 310 with the enterprise network). As such, bot controller 320 may maintain a real-time record of the status and activities of bot host 310.

Figure 11:
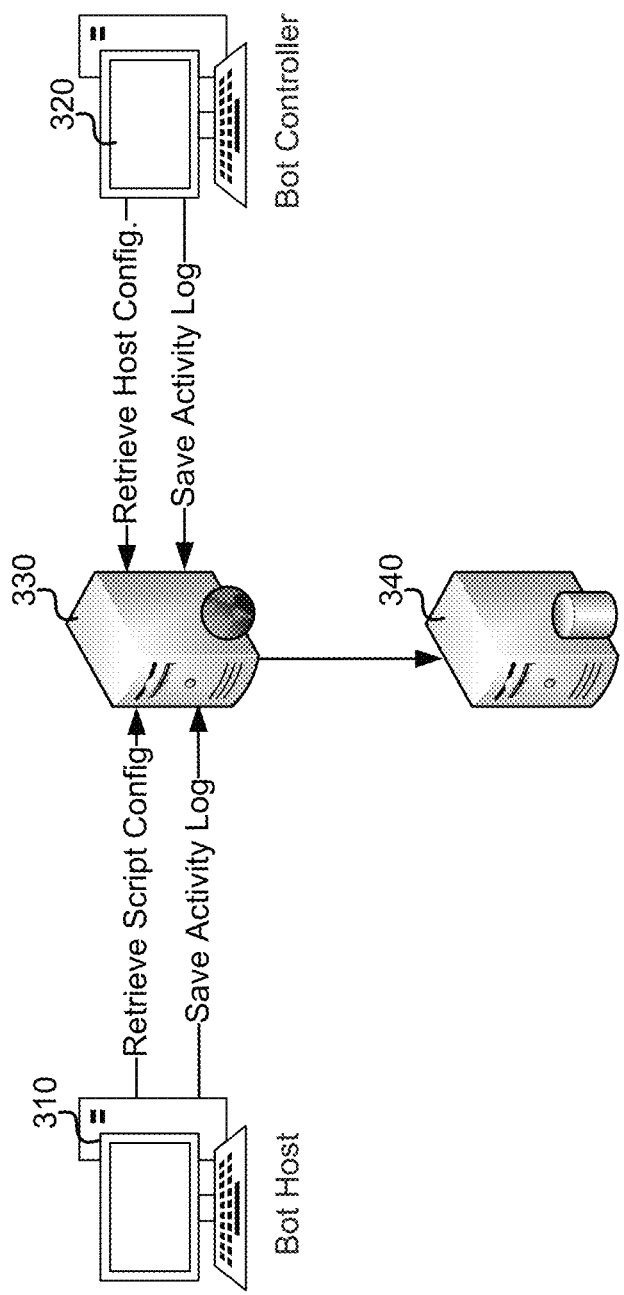
FIG. 11 is a diagram illustrating an example incoming communication flow of a web services gateway with a registered bot host, a bot controller, and a database server over an enterprise network during implementation of the methods described herein.

FIG. 11 is a diagram illustrating an example incoming communication flow of a web services gateway 330 with a registered bot host 310, a bot controller 320, and a database server 340 over an enterprise network during implementation of the methods described herein. As illustrated in this example, web services gateway 330 may retrieve script specific configuration data from a bot host 310 and save activity logs/notifications generated by the bot host 310. The system may support configuration data at a bot host level and a bot script level. For example, as alluded to above, bot host configuration data could include data such as OS/domain credentials used at a particular workstation associated with a bot host, and bot script level configuration data could include data that is specific to a bot script such as, for example, to what user to transmit a notification to if the bot script is unable to perform a task as programmed.

Additionally, web services gateway 330 may retrieve bot host configuration data from bot controller 320 and save activity logs/notifications received by or generated by bot controller 320. The data retrieved by web services gateway 330 may be stored in one or more databases of a database server 340 and made accessible in real-time through a bot controller or other application.

As noted above, in various implementations bot hosts may utilize an IIAE (e.g., by calling or invoking an API of the IIAE) to perform NLP of instructions received from customers. The IIAE may be tailored (e.g., through training of the IIAE and keyword and synonym-keyword dictionaries) to understand customer instructions relating to enterprise tasks automated by the bot host by executing scripts. For example, in the real estate context, the IIAE may be tailored to understand instructions relating to assignment of an escrow task, assignment of a real estate agent, and/or creation of a real-estate product type (e.g., appraisal order, title file, etc.)

Figure 12:
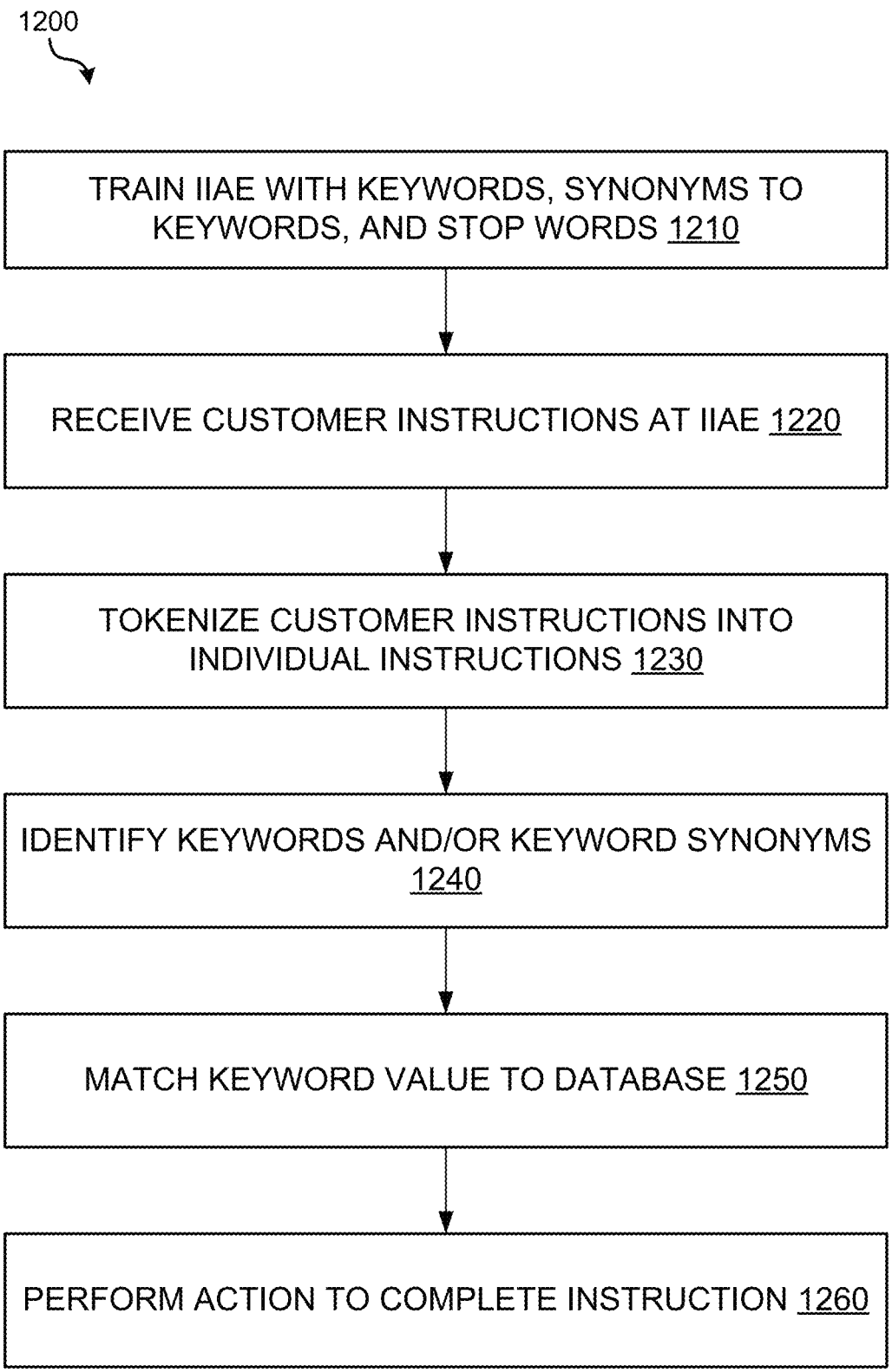
FIG. 12 is an operational flow diagram illustrating an example method that may be implemented by an intelligent instruction analyzer engine to process unstructured customer instructions in accordance with embodiments.

FIG. 12 is an operational flow diagram illustrating an example method 1200 that may be implemented by an IIAE to process unstructured customer instructions in accordance with embodiments. At operation 1210, the IIAE may be trained to understand customer instructions by feeding different examples of instructions to it. For example, the IIAE may be trained with keywords that the engine should concern itself with. In the real estate context, for example, keywords may include terms such as "Escrow Officer", "Escrow Assistant", "Product Type", "Service Type" etc. Using the trained keywords, a keyword dictionary may be created.

The IIAE may also be trained with synonyms that have been used in the past to describe a keyword. For example, the synonym "EO" may have been used to describe an "Escrow Officer." Using the trained synonyms, a keyword-synonym dictionary may be created. Additionally, the IIAE may be trained by building a stop word dictionary of stop words that have little to no value in understanding customer instructions. For example, words such as prepositions (e.g., "of", "on", etc.) and articles (e.g., "the" and and) may have little to no importance in the process automation context. By contrast, words like proper names generally have high importance and are not added to the stop word dictionary. In implementations, stop word dictionaries may be built using prior stop word lists or dictionaries as a starting point and further refining them. In implementations, training may continue as the IIAE receives customer instructions over time, thereby improving the accuracy and reliability of the engine over time.

At operation 1220, the IIAE may receive customer instructions for processing. In implementations, the IIAE may receive the customer instructions from a bot host that retrieved the instructions by executing a bot script. For example, the bot host may retrieve the customer instructions from an email received through a mail exchange application, from an online posting received through a webpage or web-based interface, from a telephonic text message, or through some other means. The instructions may be received as a string of characters.

At operation 1230, the IIAE may tokenize the received customer instructions into individual instructions. For example, the received customer instructions may be tokenized into individual sentences by searching for the character string "." or variations thereof. By way of example, consider receipt of the following instructions in the real estate context: "Please, assign Joe smith as the Escrow officer. Agent should be Susanne Gaither. Service Type: Escrow. Product Type: Lenders Policy." The instructions may be tokenized into the following four sentences:
1) Please assign Joe Smith as the Escrow Officer
2) Agent should be Susanne Gaither
3) Service Type: Escrow
4) Product Type Lenders Policy Following tokenization, at operation 1240, keywords and/or keyword synonyms may be identified for each instruction. In implementations, keywords may be identified by first removing any stop words from a sentence (e.g., by comparing the words against the learned stop word dictionary) and then matching the remaining words with a keyword dictionary and/or keyword-synonym dictionary.

For instance, consider the prior example where the first instruction is "Please assign Joe Smith as the Escrow Officer." To identify keywords, the engine may first remove stop words of little to no importance using the trained stop word dictionary. In this example, the words "please", "assign", "as", and "the" may be identified as stop words having little to no importance and removed from the sentence. It should be noted that although in the foregoing example the word "assign" defines a relevant action, in the context of this customer instruction it is the only possible action and thus carries little importance.

Following removal of stop words, only keywords and/or keyword synonyms and values for those keywords/keyword synonyms may be left in the instruction. For instance, in the foregoing example, the customer instruction is reduced to "Joe Smith Escrow Officer." The phrase "Escrow Officer" may be identified as a keyword using the keyword dictionary. As such all that is left is the keyword "Escrow Officer" and its associated value "Joe Smith."

At operation 1250, following identification of the keywords (and their values), the values may be matched with a nearest value of a database containing values relating to the value's keyword. For example, in the real estate context discussed above, a database containing the names of all escrow officers in the enterprise (e.g., an "Escrow Officer" database may be queried for the name "Joe Smith." Following matching of the keyword value, at operation 1260, additional actions can be performed to complete the customer instruction. For example, in the real estate context discussed above, the escrow officer identified from the database may be associated as the escrow officer of a title file. For example, if a bot host is executing a T-file creation script, the bot host may enter an ID of the escrow officer into an web-serviced accessed by the bot host for T-file creation.

Operations 1240-1260, discussed above, may be performed for each tokenized instruction identified during operation 1230. For example, in the real estate context discussed above, operations 1240-1260 may be performed for each of second, third, and fourth instructions: "2) Agent should be Susanne Gaither . . . 3) Service Type: Escrow . . . 4) Product Type Lenders Policy."

It should be noted that in the examples described above, depending on the process automation script that calls the IIAE, the IIAE may utilize different keyword dictionaries, keyword-synonym dictionaries, and/or different stop word dictionaries, to perform the operations of method 1200. For example, a different set of keywords may be relevant to automating T-File creation as opposed to automating an appraisal order. As such, in various implementations, the IIAE may be configured to maintain different dictionaries of keywords, keyword-synonyms, and stop words for use with different scripts.

Figure 13:
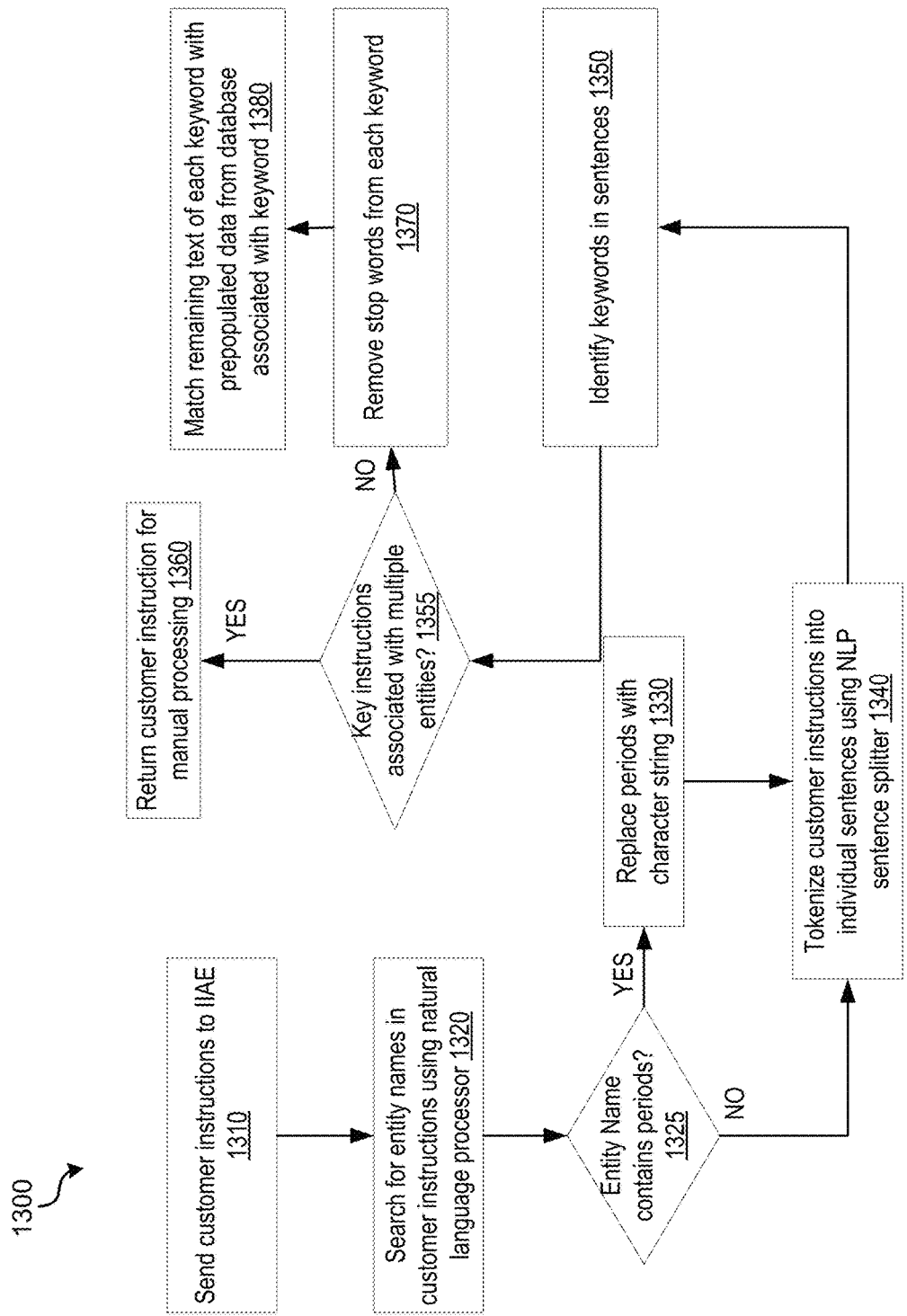
FIG. 13 is an operational flow diagram illustrating a particular method that may be implemented by an instruction analyzer engine to process unstructured customer instructions in accordance with particular embodiments.

FIG. 13 is an operational flow diagram illustrating a particular method 1300 that may be implemented by an IIAE to process unstructured customer instructions in accordance with particular embodiments. At operation 1310, customer instructions may be received at the IIAE. For example, unstructured customer instructions may be received from a bot host as discussed above with reference to operation 1220. At operation 1320, the IIAE may search for entity names in the customer instructions using a natural language processor. For example, the IIAE may use the Stanford NLP, the Apache OpenNLP, or the Clear NLP to identify entity names.

At decision 1325, it is determined if the entity names contain periods. If they do, at operation 1330 the periods may be replaced with a unique character string) (e.g., "$$") at operation 1330. The removal of periods from entity names may allow for subsequent tokenization of the instructions by sentences without problem, as period characters can be used to search for the end of sentences. At operation 1340, the customer instructions may be tokenized into individual sentences using a NLP sentence splitter. For example, the Stanford Tokenizer may be utilized to split the instructions into individual sentences. In embodiments, the instructions may be split into individual sentences by searching for one or more of the following characters: ., !, \n, \r, . . . , ?, ;,). Following tokenization of the instructions into individual sentences, the unique character strings generated at operation 1330 may again be replaced with periods.

At operation 1350, keywords may be identified in each of the sentences. The identified keywords may include key instructions (e.g., "do not copy") and key terms that identify entities (e.g., "Escrow Officer"). For example, as alluded to above in the discussion of method 1200, the IIAE may be preconfigured with and/or learn a set of keywords that are significant to a specific process or script. For instance, in the context of a T-file creation process, the phrases "Escrow Officer" and "Document Name" may be configured as keywords. As another example, in another process, the phrases "Good through Date" and "Loan Type" may be configured as keywords.

At decision 1355, it is determined if a keyword (e.g., a key instruction) is associated with multiple entities. In such cases, the system may not be able to make a decision as to how to resolve the customer instructions. For example, if two escrow officer names are referenced in a customer instruction, the system may not be able to determine which officer an order should be assigned to. If so, at operation 1360 the customer instruction may be returned for manual processing. For example, a determination that a key instruction is contained in multiple sentences having different associated entities may cause a bot host to generate an alert or other type of notification that is made available to bot controllers.

If a keyword is not associated with multiple entities, at operation 1370, stop words may be removed from each of the keywords using a stop word dictionary. At operation 1380, the remaining text of each of the keywords may be matched with prepopulated data from a database associated with the keyword. In particular implementations, text may be matched with prepopulated data in a database by taking a three-stage approach. First, if the text matches any of the searched databases values, then that database value may be returned with a high level of confidence. Second, if the text does not match a database value, but matches a synonym of the searched database values, then that database value may be returned with a high level of confidence. Third, if the text still does not match a value in the database, then a minimum edit distance between the text and the database values may be computed. For example, a minimum edit distance may be computed by determining the Damerau-Levenshtein distance between the text and each database value. If the minimum edit distance is less than a predetermined threshold, then that database value may be returned with a medium or high level of confidence.

Figure 14:
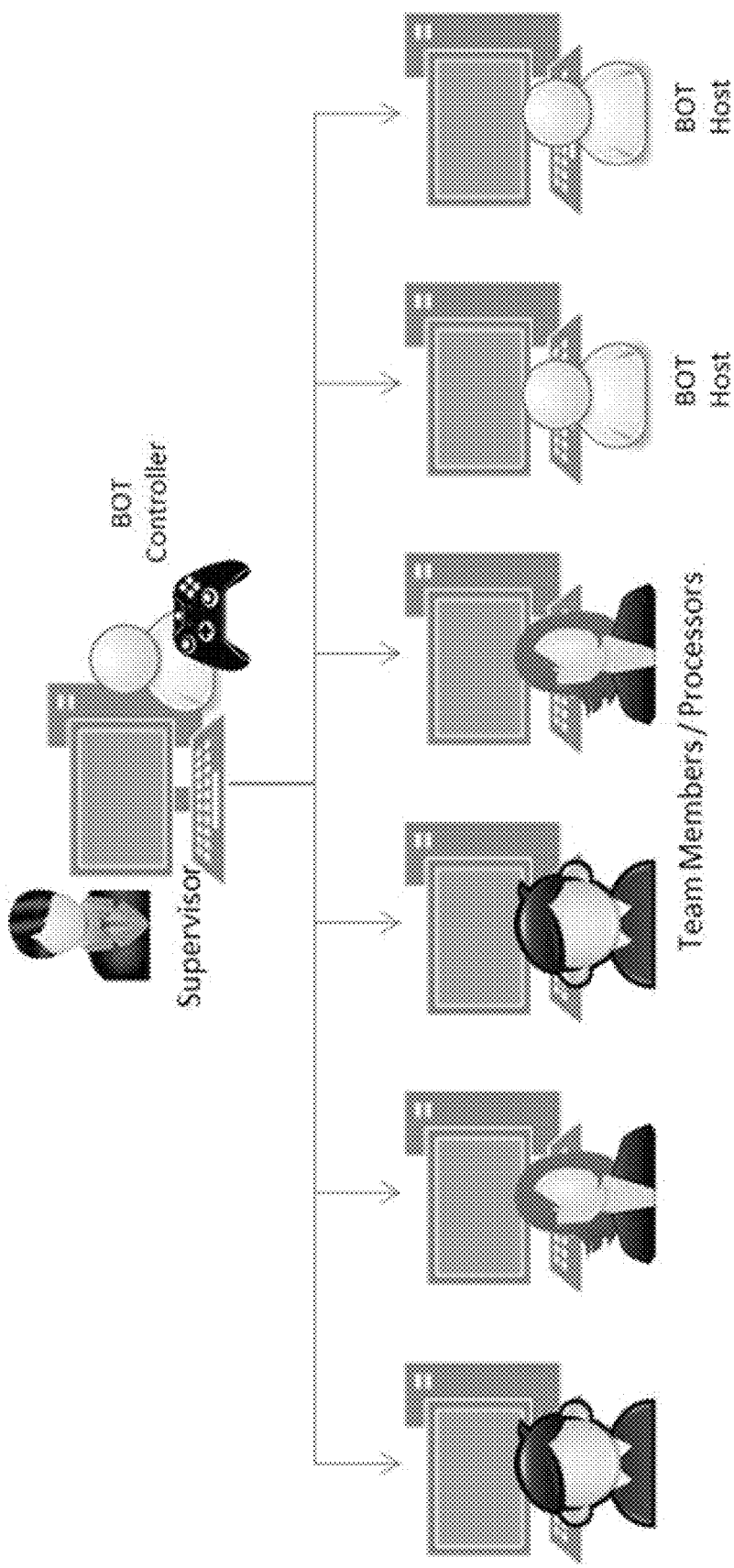
FIG. 14 illustrates an example structure of a production team during implementation of systems and methods in accordance with the technology disclosed herein.

FIG. 14 illustrates an example structure of a production team during implementation of systems and methods in accordance with the technology disclosed herein. As illustrated, enterprise tasks may be distributed among a combination of human users and bot hosts. Enterprise tasks most amenable to automation through one or more scripts may be assigned to the bot hosts by the bot controller.

As the foregoing examples illustrate, a variety of benefits may be realized by utilizing the disclosed framework, including bot controllers for managing and monitoring bot hosts for automating enterprise tasks. First, as the bot hosts are enterprise process agnostic, any commonly available and/or open source automation libraries may be used to develop scripts to perform enterprise tasks. Each bot host is capable of performing any enterprise tasks assigned to it, provided the bot host's machine has the ability to run the required software applications, including the necessary software libraries, drivers, and credentials. This feature enables a manager of an enterprise team to balance work load across different bot hosts, including assigning or reassigning different enterprise tasks to bot hosts depending on present needs of the enterprise or enterprise division. For example if a bot host is currently executing a t-file creation script to process title orders, but the queue for appraisal orders is significantly greater, the bot host may be reconfigured to begin executing an appraisal order script.

Second, by logging each of the process performed by each bot host in real-time, a supervisor can optimally monitor bot hosts in real-time and take quick corrective actions if the bot hosts run into any errors during execution. In addition to facilitating troubleshooting and configuration of the bot hosts, logging each of the processes performed by each bot host creates an audit trail (e.g., by storing the activity log in a database server) that helps ensure regulatory compliance by the enterprise.

Third the automation of rules-based enterprise tasks by using bot hosts can reduce the training requirement of manual processors and greatly increase the speed and accuracy with which enterprise tasks are completed. Further still, the bot hosts may execute scripts that call an intelligent instruction analyzer engine that allows interpretation of unstructured human instructions, further expanding the number of enterprise tasks that may be automated by the bot hosts.

Figure 15:
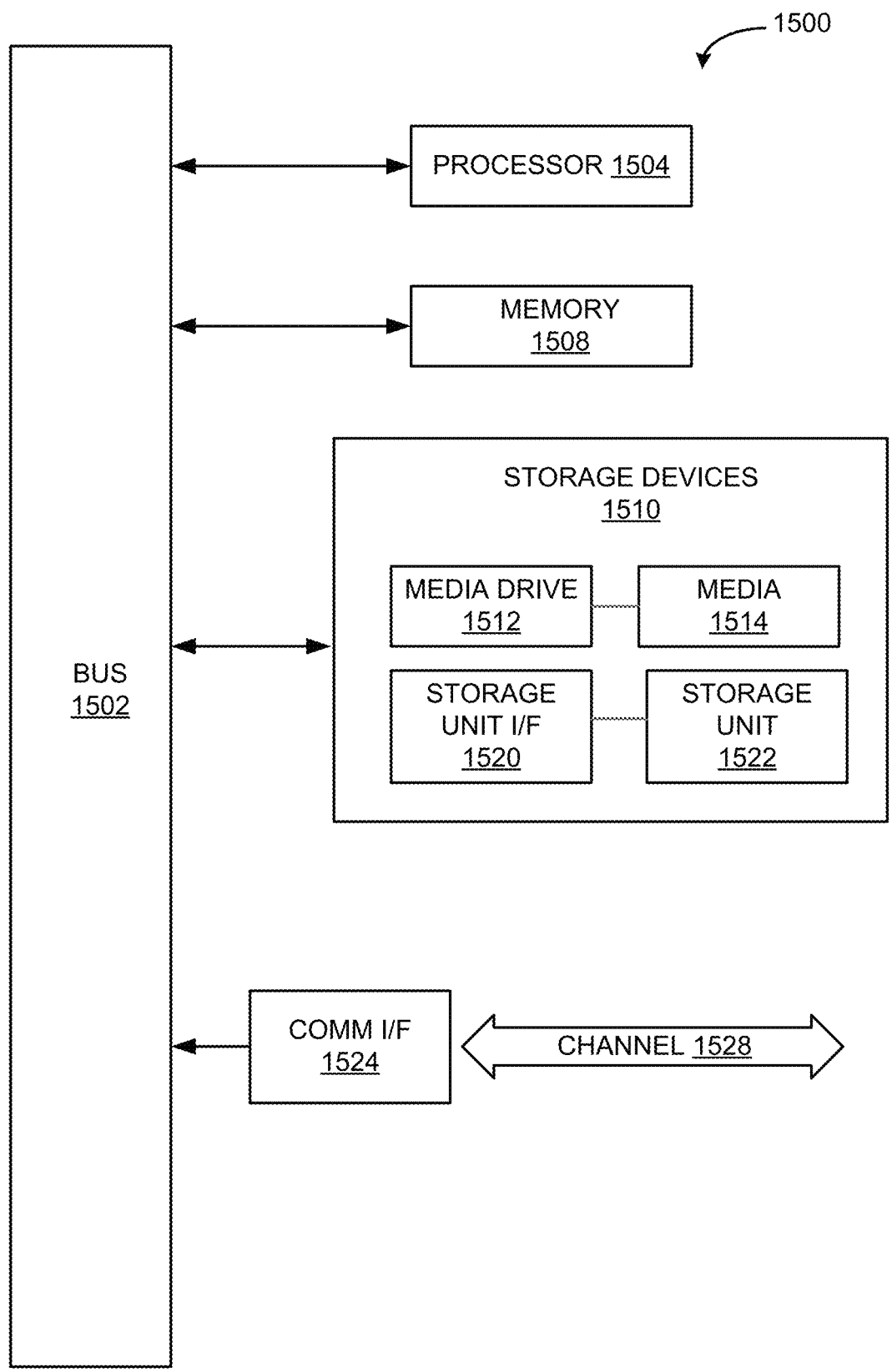
FIG. 15 is an example of a computing module that can be used in conjunction with various embodiments of the present disclosure.

FIG. 15 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 15. Various embodiments are described in terms of this example-computing module 1500. After reading this description, it will become apparent to a person skilled in the relevant art how to implement the application using other computing modules or architectures.

Referring now to FIG. 15, computing module 1500 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1500 might include, for example, one or more processors, controllers, control modules, or other processing devices, such as a processor 1504. Processor 1504 might be implemented using a general-purpose or special-purpose processing engine such as, for example, a microprocessor, controller, or other control logic. In the illustrated example, processor 1504 is connected to a bus 1502, although any communication medium can be used to facilitate interaction with other components of computing module 1500 or to communicate externally.

Computing module 1500 might also include one or more memory modules, simply referred to herein as main memory 1508. For example, preferably random access memory (RAM) or other dynamic memory, might be used for storing information and instructions to be executed by processor 1504. Main memory 1508 might also be used for storing temporary variables or other intermediate information during execution of instructions to be executed by processor 1504. Computing module 1500 might likewise include a read only memory ("ROM") or other static storage device coupled to bus 1502 for storing static information and instructions for processor 1504.

The computing module 1500 might also include one or more various forms of information storage mechanism 1510, which might include, for example, a media drive 1512 and a storage unit interface 1520. The media drive 1512 might include a drive or other mechanism to support fixed or removable storage media 1514. For example, a hard disk drive, a solid state drive, a magnetic tape drive, an optical disk drive, a CD, DVD, or BLU-RAY drive (R or RW), or other removable or fixed media drive might be provided. Accordingly, storage media 1514 might include, for example, a hard disk, a solid state drive, magnetic tape, cartridge, optical disk, a CD, a DVD, a BLU-RAY, or other fixed or removable medium that is read by, written to or accessed by media drive 1512. As these examples illustrate, the storage media 1514 can include a computer usable storage medium having stored therein computer software or data.

In alternative embodiments, information storage mechanism 1510 might include other similar instrumentalities for allowing computer programs or other instructions or data to be loaded into computing module 1500. Such instrumentalities might include, for example, a fixed or removable storage unit 1522 and an interface 1520. Examples of such storage units 1522 and interfaces 1520 can include a program cartridge and cartridge interface, a removable memory (for example, a flash memory or other removable memory module) and memory slot, a PCMCIA slot and card, and other fixed or removable storage units 1522 and interfaces 1520 that allow software and data to be transferred from the storage unit 1522 to computing module 1500.

Computing module 1500 might also include a communications interface 1524. Communications interface 1524 might be used to allow software and data to be transferred between computing module 1500 and external devices. Examples of communications interface 1524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1524 might typically be carried on signals, which can be electronic, electromagnetic (which includes optical) or other signals capable of being exchanged by a given communications interface 1524. These signals might be provided to communications interface 1524 via a channel 1528. This channel 1528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory mediums, volatile or non-volatile, such as, for example, memory 1508, storage unit 1522, and media 1514. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method, comprising:
   registering and initializing, at an enterprise network system, multiple bot hosts on one or more first machines, each of the bot hosts configured to manage one or more bots corresponding to one or more scripts installed on one of the first machines that the bot host is deployed on, the multiple bot hosts including a first bot host and a second bot host;
   running, at multiple second machines of the enterprise network system, multiple respective bot controller application instances, the multiple second machines being different from the one or more first machines;
   assigning, at one or more of the bot controller application instances, a first script for execution by the first bot host, and a second script for execution by the second bot host;
   receiving, in real-time, at each of the bot controller application instances, first notifications generated by the first bot host during execution of the first script, and second notifications generated by the second bot host during execution of the second script; and
   storing, at the enterprise network system, activity logs generated in response to the first bot host executing the first script and the second bot host executing the second script.

2. The method of claim 1, wherein registering and initializing the bot hosts comprises, for each of the bot hosts:
   assigning the bot host an IP address and identifier within the enterprise network system; and
   installing, on the one of the first machines that the bot host is deployed on, one or more drivers and one or more software libraries needed to run the one or more scripts.

3. The method of claim 2, further comprising: receiving, at each of the bot controller application instances, registration information from at least one bot host of the bot hosts, the registration information comprising a network address of the at least one bot host and an identification of the one or more scripts currently installed on the one of the first machines that the at least one bot host is deployed on.

4. The method of claim 1, wherein the one or more scripts comprise: a script for creating title files, a script for creating appraisal order entries, or a title examination process script.

5. The method of claim 1, wherein running, at the multiple second machines of the enterprise network system, the multiple respective bot controller application instances comprises: executing each of the bot controller application instances at a respective one of the second machines.

6. The method of claim 1, wherein each bot controller application instance of the bot controller application instances is configured to manage and control only one or more of the bot hosts associated with the same enterprise division as one of the second machines running the bot controller application instance.

7. The method of claim 1, further comprising: monitoring, at each of the bot controller application instances, at least one bot host of the bot hosts, wherein monitoring the at least one bot host comprises: displaying, in real-time, at each of the bot controller application instances, multiple time-stamped notifications of multiple respective actions performed by the at least one bot host in response to executing at least one script assigned to the at least one bot host.

8. The method of claim 1, wherein the bot controller application instances comprise a first bot controller application instance and a second bot controller application instance, the method further comprising: in response to determining that the first bot host is under the control of the first bot controller application instance, presenting a notification at the second bot controller application instance indicating that the first bot host is locked from use.

9. The method of claim 1, further comprising:
storing, in a database, configuration data for each of the bot hosts, the configuration data comprising credentials associated with the one of the first machines the bot host is deployed on, or script level configuration data associated with one of the one or more scripts installed on the one of the first machines that the bot host is deployed on; and
accessing, in real-time, at one of the bot controller application instances, the stored configuration data of one of the bot hosts.

10. An enterprise network system, comprising:
one or more first machines on which multiple bot hosts are deployed on, each of the bot hosts configured to manage one or more bots corresponding to one or more scripts installed on one of the first machines that the bot host is deployed on, the multiple bot hosts including a first bot host and a second bot host;
multiple second machines different from the one or more first machines, the second machines configured to:
run multiple respective bot controller application instances;
assign to the bot hosts, using one or more of the bot controller application instances, a first script for execution by the first bot host, and a second script for execution by the second bot host; and
receive, in real-time, at each of the bot controller application instances, notifications generated by the first bot host during execution of the first script, and second notifications generated by the second bot host during execution of the second script; and
a server configured to store activity logs generated in response to the first bot host executing the first script and the second bot host executing the second script.

11. The system of claim 10, wherein each of the bot hosts is assigned an IP address and identifier within the enterprise network system, wherein installed on the one of the first machines that the bot host is deployed on are one or more drivers and one or more software libraries needed to run the one or more scripts.

12. The system of claim 11, wherein the second machines are further configured to: receive, at each of the bot controller application instances, registration information from at least one bot host of the bot hosts, the registration information comprising a network address of the at least one bot host and an identification of the one or more scripts currently installed on the one of the first machines that the at least one bot host is deployed on.

13. The system of claim 10, wherein the one or more scripts comprise: a script for creating title files, a script for creating appraisal order entries, or a title examination process script.

14. The system of claim 10, wherein running the multiple respective bot controller application instances comprises: executing each of the bot controller application instances at a respective one of the second machines.

15. The system of claim 10, wherein each bot controller application instance of the bot controller application instances is configured to manage and control only one or more of the bot hosts associated with the same enterprise division as one of the second machines running the bot controller application instance.

16. The system of claim 10, wherein the second machines are further configured to: monitor, at each of the bot controller application instances, at least one bot host of the bot hosts, wherein monitoring the at least one bot host comprises: displaying, in real-time, at each of the bot controller application instances, multiple timestamped notifications of multiple respective actions performed by the at least one bot host in response to executing at least one script assigned to the at least one bot host.

17. The system of claim 10, wherein:
the bot controller application instances comprise a first bot controller application instance and a second bot controller application instance;
the second machines are further configured to: in response to determining that the first bot host is under the control of the first bot controller application instance, presenting a notification at the second bot controller application instance indicating that the first bot host is locked from use.

18. The system of claim 10, wherein:
the system further comprises: a database configured to store configuration data for each of the bot hosts, the configuration data comprising credentials associated with the one of the first machines the bot host is deployed on, or script level configuration data associated with one of the one or more scripts installed on the one of the first machines; and
the second machines are further configured to: access, at one of the bot controller application instances, in real-time, the stored configuration data of one of the bot hosts.

19. A method comprising:
running, at multiple first machines of an enterprise network system, multiple respective bot controller application instances;
receiving, at each of the bot controller application instances, registration information from each bot host of multiple bot hosts, each bot host configured to manage one or more bots corresponding to one or more scripts installed on a second machine that the bot host is deployed on, the registration information comprising a network address of each of the bot hosts and an identification of the one or more scripts installed on the second machine, wherein the first machines are different from the second machine; and
displaying, at each of the bot controller application instances, using at least the registration information, an identification of each of the bot hosts, an identification of the one or more scripts installed on the second machine that each of the bot hosts is deployed on, an identification of a script currently being executed by each of the bot hosts, and a control for assigning scripts for execution by one or more of the bot hosts.

20. The method of claim 19, further comprising: displaying, in real-time, at each of the bot controller application instances, multiple timestamped notifications of multiple respective actions performed by each of the bot hosts in response to executing the script.

* * * * *